US006553717B2

(12) United States Patent
St. John et al.

(10) Patent No.: US 6,553,717 B2
(45) Date of Patent: Apr. 29, 2003

(54) RETROFIT POWER DOOR ASSEMBLY

(75) Inventors: Robert A. St. John, Cheshire, CT (US); Thomas M. Kowalczyk, Farmington, CT (US); Quan H. Nguyen, Needham Heights, MA (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/946,133

(22) Filed: Sep. 5, 2001

(65) Prior Publication Data

US 2002/0026750 A1 Mar. 7, 2002

Related U.S. Application Data

(63) Continuation-in-part of application No. 09/635,401, filed on Aug. 10, 2000, and a continuation-in-part of application No. 09/631,106, filed on Aug. 1, 2000, now Pat. No. 6,481,160

(60) Provisional application No. 60/230,433, filed on Sep. 6, 2000, and provisional application No. 60/148,100, filed on Aug. 10, 1999.

(51) Int. Cl.[7] .......................... E05F 11/24; F16D 11/04

(52) U.S. Cl. ............................ 49/340; 49/341; 49/139; 192/69.8

(58) Field of Search ......................... 49/324, 345, 339, 49/340, 341, 139, 140; 192/69.8, 69.82, 89.27

(56) References Cited

U.S. PATENT DOCUMENTS

| | | | | |
|---|---|---|---|---|
| 1,680,517 A | | 8/1928 | Harris | |
| 1,799,740 A | | 4/1931 | Felton | |
| 1,891,359 A | | 12/1932 | Rowntree | |
| 2,024,300 A | | 12/1935 | Miller | |
| 2,091,388 A | | 8/1937 | Dorsey | |
| 2,639,142 A | | 5/1953 | Morgan et al. | |
| 3,284,950 A | | 11/1966 | Gute | |
| 3,874,117 A | | 4/1975 | Boehm | |
| 3,886,425 A | | 5/1975 | Weiss | |
| 4,007,557 A | | 2/1977 | Davis et al. | |
| 4,339,843 A | | 7/1982 | Burnett, Jr. | |
| 4,348,835 A | | 9/1982 | Jones et al. | |
| 4,365,442 A | | 12/1982 | Speer | |
| 4,429,490 A | | 2/1984 | Zunkel | |
| 4,501,090 A | | 2/1985 | Yoshida et al. | |
| 4,541,202 A | | 9/1985 | Dockery | |
| 4,551,946 A | | 11/1985 | Yoshida et al. | |
| 4,658,545 A | | 4/1987 | Ingham et al. | |
| 4,660,324 A | | 4/1987 | Nyenbrink | |
| 4,727,679 A | | 3/1988 | Kornbrekke et al. | |
| 4,881,018 A | * | 11/1989 | Kato et al. | 49/349 X |
| 4,895,048 A | * | 1/1990 | Key et al. | 49/139 X |
| 4,972,629 A | | 11/1990 | Merendino et al. | |
| 5,018,304 A | | 5/1991 | Longoria | |

(List continued on next page.)

FOREIGN PATENT DOCUMENTS

| | | |
|---|---|---|
| DE | 1 128 325 | 4/1962 |
| DE | 2 649 435 | 5/1977 |
| DE | 86 12 331.9 | 5/1986 |
| DE | 298 01 134 U1 | 4/1998 |
| DE | 197 26 021 A 1 | 12/1998 |
| EP | 0 499 884 A1 | 5/1992 |
| FR | 1 425 479 | 12/1966 |
| FR | 2 664 644 | 1/1992 |
| FR | 2742772 | 11/1997 |
| JP | 4-131487 | 5/1992 |
| RU | 685 798 | 1/1976 |

*Primary Examiner*—Daniel P. Stodola
*Assistant Examiner*—Hugh B. Thompson
(74) *Attorney, Agent, or Firm*—Pillsbury Winthrop LLP

(57) ABSTRACT

A retrofit power door assembly for installation on a manual door assembly. One aspect is related to a retrofit power door assembly having an axial operator. Another aspect relates to a retrofit power door assembly having a clutch with a manually engageable release member.

44 Claims, 16 Drawing Sheets

U.S. PATENT DOCUMENTS

| | | | | | |
|---|---|---|---|---|---|
| 5,040,331 | A | | 8/1991 | Merendino et al. | |
| 5,050,346 | A | | 9/1991 | Eccleston | |
| 5,095,654 | A | | 3/1992 | Eccleston | |
| 5,212,907 | A | | 5/1993 | Van Sandt | |
| 5,221,239 | A | | 6/1993 | Catlett | |
| 5,375,374 | A | | 12/1994 | Rohroff, Sr. | |
| 5,386,885 | A | | 2/1995 | Bunzl et al. | |
| 5,392,562 | A | | 2/1995 | Carambula | |
| 5,422,552 | A | | 6/1995 | Parisi | |
| 5,507,120 | A | | 4/1996 | Current | |
| 5,613,321 | A | | 3/1997 | Rizkovsky | |
| 5,634,296 | A | | 6/1997 | Hebda | |
| 5,634,298 | A | | 6/1997 | Slopack | |
| 5,656,898 | A | | 8/1997 | Kalina | |
| 5,727,348 | A | | 3/1998 | Arnell et al. | |
| 5,813,171 | A | | 9/1998 | Piltingsrud | |
| 5,831,403 | A | | 11/1998 | Kanki et al. | |
| 5,878,530 | A | | 3/1999 | Eccleston et al. | |
| 5,881,497 | A | | 3/1999 | Borgardt | |
| 5,910,075 | A | | 6/1999 | Arnell et al. | |
| 5,930,954 | A | | 8/1999 | Hebda | |
| 5,956,249 | A | | 9/1999 | Beran et al. | |
| 6,053,293 | A | * | 4/2000 | Sato et al. | 192/35 |
| 6,055,885 | A | | 5/2000 | Shea | |
| 6,061,964 | A | | 5/2000 | Arnell et al. | |
| 6,067,753 | A | | 5/2000 | Hebda | |
| 6,430,871 | B1 | * | 8/2002 | Hebda | 49/340 |

* cited by examiner

RETROFIT POWER DOOR ASSEMBLY

The present application claims priority to U.S. Provisional Application of St. John et al., Ser. No. 60/230,433 filed Sep. 6, 2000, the entirety of which is hereby incorporated into the present application by reference.

The present application also claims priority as a continuation-in-part to U.S. Application of Kowalczyk et al., Ser. No. 09/631,106 filed Aug. 1, 2000, now U.S. Pat. No. 6,481,160, and U.S. Application of Kowalczyk et al., Ser. No. 09/635,401 filed Aug. 10, 2000, each of which in turn claim priority to U.S. Provisional Application of Kowalczyk, Ser. No. 60/148,100 filed Aug. 10, 1999. The entirety of each of these applications is hereby incorporated into the present application by reference.

FIELD OF THE INVENTION

The present invention relates to power door assemblies and, more particularly, to a retrofit power door assembly for installation on a manual swing door assembly.

BACKGROUND AND SUMMARY OF THE INVENTION

Power operated door assemblies have been retrofit onto manual swing door assemblies and used to open and/or close an associated swinging door panel. Previously, power operated door assemblies have utilized electric motors to move the door between the closed and open positions. These designs are generally bulky and many require extensive modification to existing door frames and/or panels to allow the assembly to be used therewith. Furthermore, to produce the required torque necessary to open or close a standard door, these assemblies utilize a relatively powerful motor and drive system, which normally have used either an expensive high torque motor or a bulky high reduction ratio transmission.

Other designs include pneumatic and hydraulic actuators to produce movement of the door. Some of these designs are advantageous over the previous electric motor designs, because the actuators can be made compact and relatively lightweight. However, the hydraulic pump or pneumatic compressor must be located remotely from the door in these designs. Therefore, the respective assemblies are relatively space-consumptive. Furthermore, as with the previous assemblies utilizing electric motors, the hydraulic and pneumatic operated door operating assemblies are very expensive.

Consequently, there exists a need in the art to provide a cost-efficient self-contained compact door operating system that may be easily retrofit to existing manual swing door assemblies.

It is an object of the present invention to meet the above-described need. To achieve this object, the present invention provides a retrofit power-operated door operating system for installation on a manual swing door assembly. The door assembly comprises a frame mounted to a building wall and a swinging door panel manually movable in a swinging manner with respect to the door frame between opened and closed positions thereof by manual force. The retrofit door operating system comprises a door panel mounting structure constructed and arranged to be mounted to the door panel and a wall mounting structure constructed and arranged to be mounted to the building wall. The retrofit door operating system further comprises a linkage structure connected between the door panel mounting structure and the wall mounting structure.

An axial operator of the retrofit door operating system comprises an operator output member rotatable about an operator axis that extends generally vertically when the system is installed on the swing door assembly. The operator output member and the linkage structure are constructed and arranged such that, when the system is installed on the swing door assembly, rotation of the operator output member drives the linkage structure to move the wall and door panel mounting structures relative to one another to affect powered swinging movement of the door panel between the open and closed position thereof. The axial operator further comprises an electric motor connectable to an electric power supply. The motor has a motor output member rotatable about the operator axis and is constructed and arranged to rotate the motor output member about the operator axis. A planet gear reduction transmission is connected between the motor output member and the operator output member. The reduction transmission rotates the operator output member at a lower rotational speed than a rotational speed at which the motor rotates the motor output member and applies a higher torque to the operator output member than a torque which the motor applies to the motor output member.

The reduction transmission comprises an orbit gear arranged generally coaxially with respect to the operator axis and a planet gear carrier positioned radially inwardly of the orbit gear and arranged for rotation about the operator axis. The planet gear carrier has a mounting portion offset generally radially from the output axis. The reduction transmission further comprises a planet gear rotatably mounted to the mounting portion of the planet gear carrier such that the planet gear rotates about a planet gear axis that extends through the mounting portion generally parallel to the operator axis. The planet gear is operatively connected to the motor output member and engaged with a radially inwardly facing interior surface of the orbit gear such that rotation of the motor output member rotates the planet gear relative to the planet gear carrier about the planet gear axis, which in turn causes the planet gear to roll along the interior surface of the orbit gear in a generally circumferential direction with respect to the operator axis. The planet gear carrier is thereby rotated about the output axis at a lower rotational speed and at a higher torque than the rotational speed and torque at which the motor rotates the motor output member. The planet gear carrier is operatively connected to the operator output member such that rotation of the planet gear carrier as a result of the planet gear being rotated by the motor output member as aforesaid rotates the operator output member to affect the relative movement between the frame and door panel mounting structures.

The retrofit power operated door operating system also comprises an input device operable to generate a door movement signal and a controller communicated to the motor of the axial operator. The controller is operable responsive to receiving the door movement signal to control operation of the motor so as to selectively cause the motor to rotate the motor output member and thereby rotate the operator output member to affect the powered swinging movement of the door panel between the opened and closed positions thereof.

With retrofit door operating systems, it would also be desirable to provide the system with an override that enables the door panel to be moved freely under manual power. Although in most retrofit door operating systems the door panel can be moved under manual power against the resistance of the operator (i.e., backdriving of the electric motor), jamming of internal components, such as the breakage of a gear tooth and subsequent lodging thereof in the gear train, can "freeze" the operator, thus preventing the ability to move the door panel either manually or under power.

It is therefore another object of the present invention to provide a retrofit door system with an override feature that allows the door panel to be moved freely under manual power. To achieve this object, the present invention provides a retrofit power-operated door operating system for installation on a manual swing door assembly comprising a frame mounted to a building wall and a swinging door panel manually movable in a swinging manner with respect to the door frame between opened and closed positions thereof by manual force. The retrofit door operating system comprises a door panel mounting structure constructed and arranged to be mounted to the door panel and a wall mounting structure constructed and arranged to be mounted to the building wall. A linkage structure is connected between the door panel mounting structure and the wall mounting structure. A retrofit power-operated door operator is operatively connected to the linkage structure such that, when the system is installed on the swing door assembly, the operator drives the linkage structure to affect powered swinging movement of the door panel between the open and closed positions thereof.

Additionally, the retrofit door operating system comprises a manually operable clutch movable between an engaged position wherein the clutch enables the operative connection between the operator and the linkage such that operation of the operator under power affects the powered swinging movement of the door panel and a disengaged position wherein the clutch disables the operative connection between the operator and the linkage structure to permit manual swinging movement of the door panel. The clutch has a manually engagable release member constructed and arranged to be manually moved in a releasing manner. The clutch is constructed and arranged such that manual movement of the release member in the releasing manner moves clutch from the engaged position thereof to disengaged positions thereof.

The retrofit door operating system further comprises an input device operable to generate a door movement signal and a controller communicated to the operator. The controller is operable responsive to receiving the door movement signal to control operation of the operator so as to selectively cause the operator to drive the linkage structure as aforesaid to affect the powered swinging movement of the door panel between the opened and closed positions thereof.

Other objects, features and advantages of the present invention will become apparent from the following detailed description, the accompanying drawings and the appended claims.

DETAILED DESCRIPTION OF THE INVENTION

Figure 1:
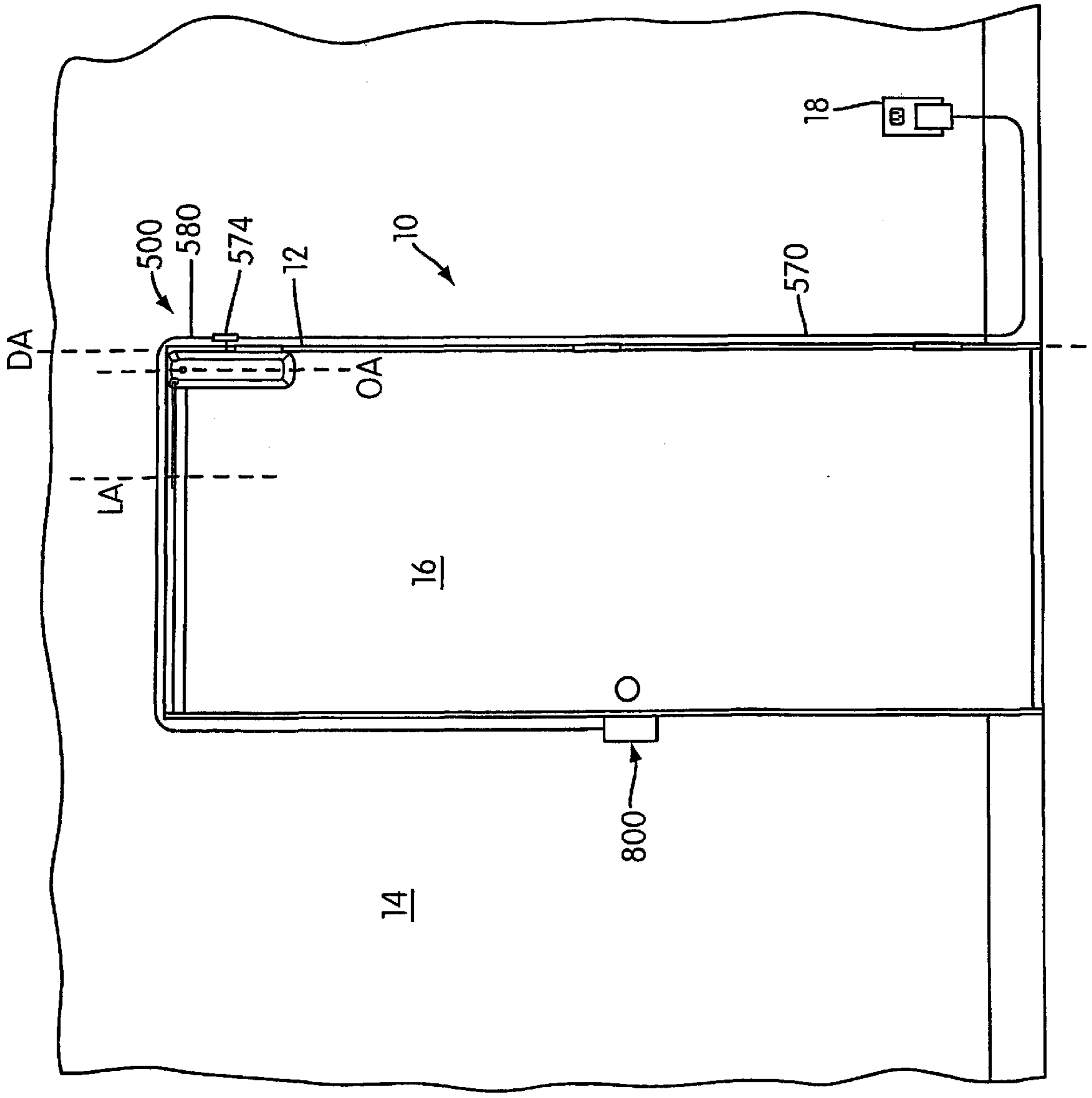
FIG. 1 is an elevated front view of a manual swing door assembly with a retrofit power operated door operating system of the present invention installed thereon.

FIGS. 1 shows a pre-existing manual swing door assembly 10 with a retrofit power-operated door operating system 500 installed thereon. The door assembly 10 comprises a door frame 12 mounted to a building wall 14 at a doorway opening and a swinging door panel 16 mounted to the frame 12 by hinges. Door panel 16 is manually movable in a swinging manner about a door moving axis DA (FIG. 1), with respect to the door frame 12, between opened and closed positions.

Figure 2:
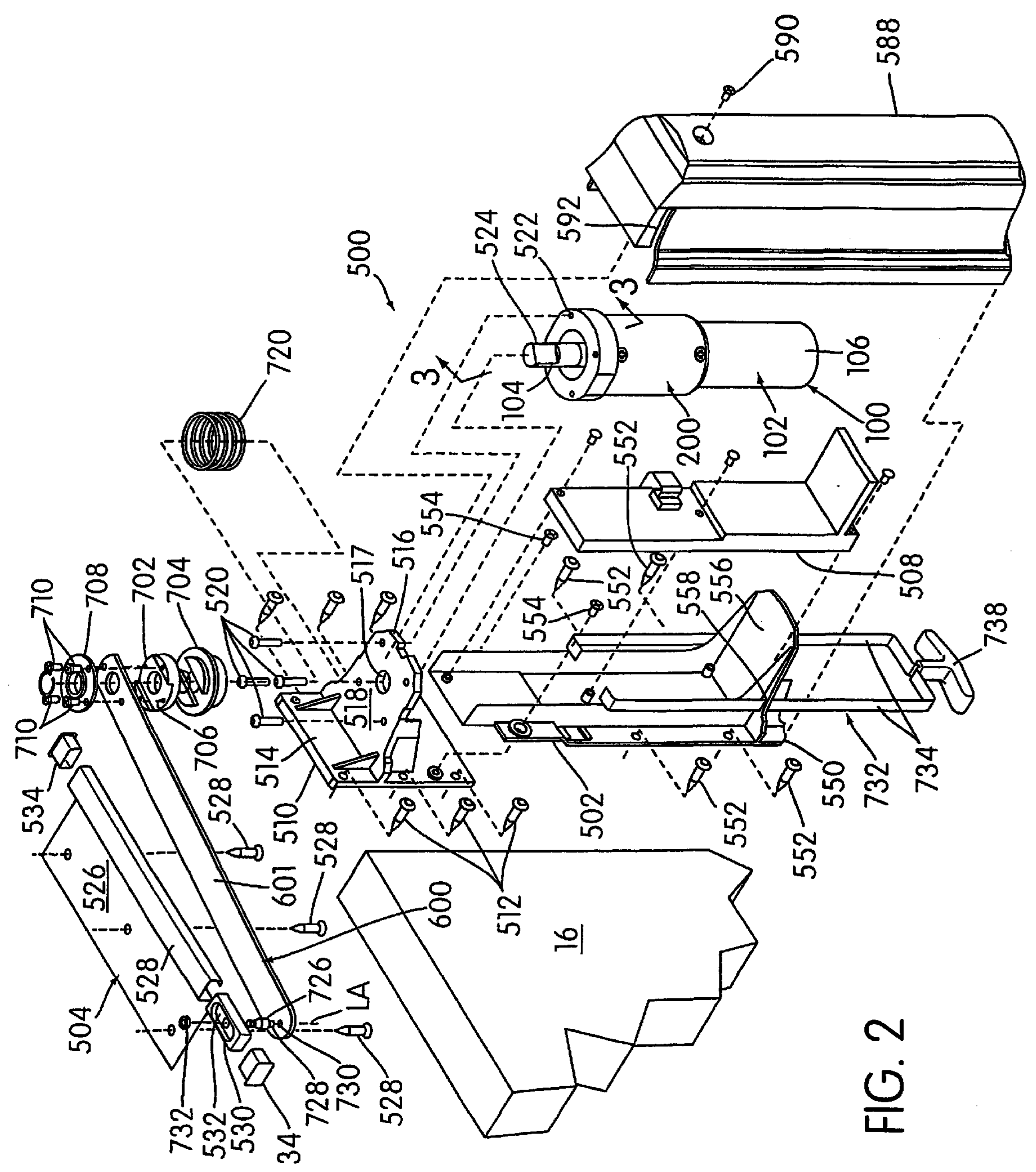
FIG. 2 is an exploded view of the retrofit power operated door operating system shown in FIG. 1.

Shown in greater detail in FIG. 2, the retrofit door operating system 500 comprises a door panel mounting structure 502 mounted to the door panel 16 and a wall mounting structure 504 mounted to the building wall 14. In the illustrated embodiment, the wall mounting structure 504 is mounted indirectly to the wall 14 by being mounted to the frame 12. However, the wall mounting structure 504 may be mounted directly to the wall 14 without being mounted to the frame 12. A linkage structure 600 is connected between the door panel and wall mounting structures 502, 504. The retrofit power-operated door operating system 500 includes an axial operator 100 that operatively connects to the linkage structure 600 such that, when the system 500 is installed on the door assembly 10, the operator drives the linkage structure to affect powered swinging movement of the door panel 16 between the open and closed positions thereof.

The axial operator 100 includes an electric motor 102 that drives a rotatable operator output member 104. A planet gear reduction transmission 200 is connected between the motor 102 and the output member 104. The reduction transmission 200 is constructed and arranged to rotate the output member 104 at a lower rotational speed than a rotational speed at which the motor 102 rotates and to apply a higher torque to the output member 104 than a torque which the motor 102 applies to the reduction transmission 200.

The retrofit door operating system 500 further includes an input device 506 for generating a door movement signal, described further hereinbelow, and a controller 508 communicated to the motor 102.

Figure 3:
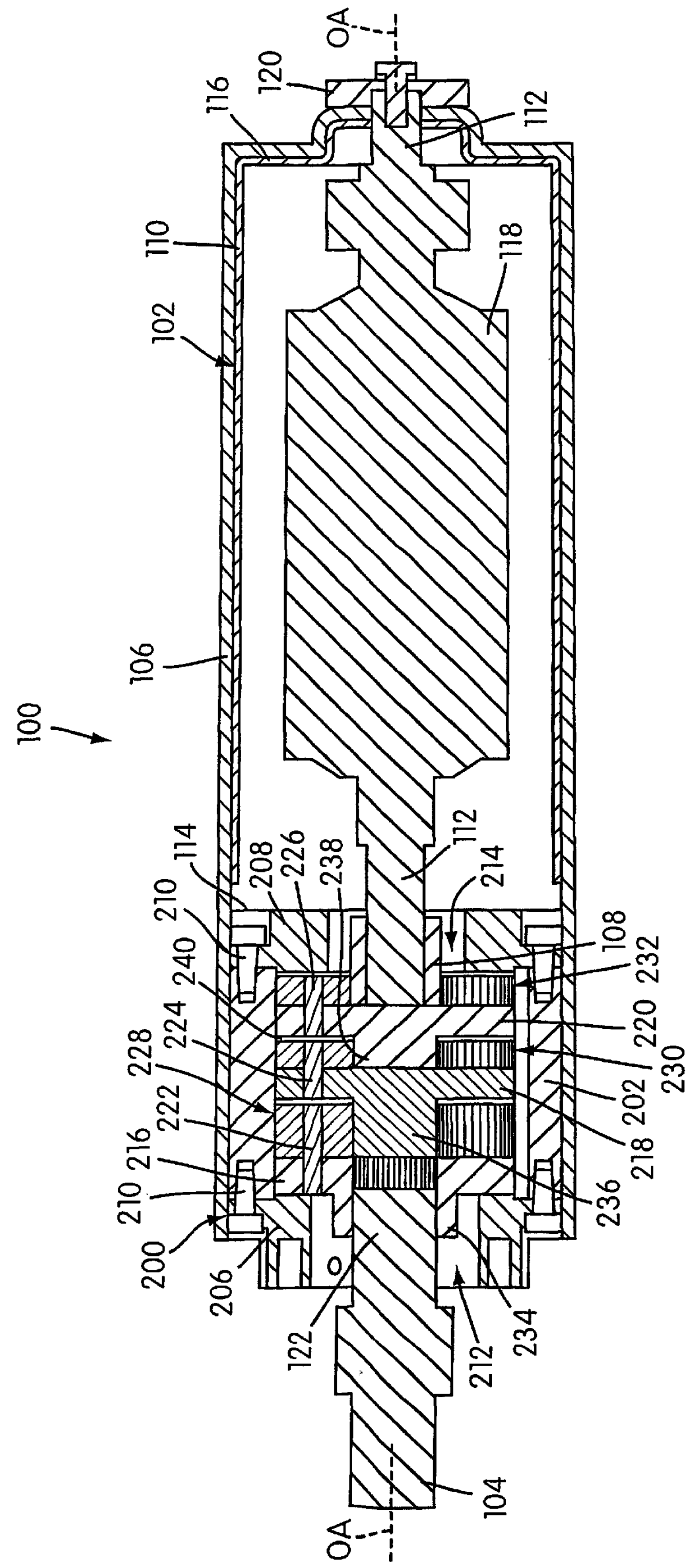
FIG. 3 is a sectional view of the axial operator taken along line 3—3 in FIG. 2.

The construction of the axial operator 100 may be best understood from FIGS. 2 and 3. The axial operator 30 includes the reversible electric motor 102, the rotatable operator output member 104 and the reduction transmission 200 mounted in torque-transmitting relation between the motor 102 and the operator output member 104. The motor 102 and the reduction transmission 200 are housed within a cylindrical casing or housing 106.

FIG. 3 shows a cross-sectional view of the assembled axial operator 100. The operator output member 104 extends outwardly from the reduction transmission 200 and rotates about an operator axis OA (FIG. 2). It can be appreciated from FIG. 1, for example, that when the axial operator 100 is mounted on the door assembly 10, the operator output member 104 (and the operator axis OA defined by the member 104) extends generally vertically and generally parallel to the door moving axis DA.

The operator output member 104 is operatively connected to the linkage structure 600 such that rotating the operator output member 104 under power moves or swings the door panel 16 between its open and closed positions. With respect to the swinging door panel 16, the operator output member 104 is operatively connected with the linkage structure 600 such that rotation of the operator output member 104 in a first rotational direction moves the door panel 16 towards and into its fully open position and such that rotation of the operator output member 104 in a second rotational direction opposite the first rotational direction moves the door panel 16 towards and into its closed position.

The reversible electric motor 102 shown is preferably a conventional D.C. motor 102. The motor 102 has a rotatable motor output member 108 that is co-axial with the operator axis OA so that the motor output member 108 rotates about the operator axis OA when the motor 102 is energized. The motor 102 is communicated to a controller 508 (shown in FIG. 2). Electrical signals transmitted from the controller 508 control operation of the motor 102 in a manner that is well-known in the art.

D.C. motors are widely commercially available and the construction and operation of such motors are well known. Hence, the details of the motor 102 are not considered in specific detail in the present application. Preferably, the motor 102 is of the type in which the direction of the rotation of the motor output member 108 can be reversed by reversing the direction of the current flowing to the motor 102. The controller 508 is in electrical communication with the motor 102 through conventional electroconductive wires (not shown) and is used in a manner well known to those skilled in the art to control the motor 102 operation and to switch the direction of the motor current. Reference may be made to U.S. Provisional Application of Ranaudo; Ser. No. 60/266,454, the entirety of which is hereby incorporated into the present application by reference, for further details concerning the control system.

Figure 4:
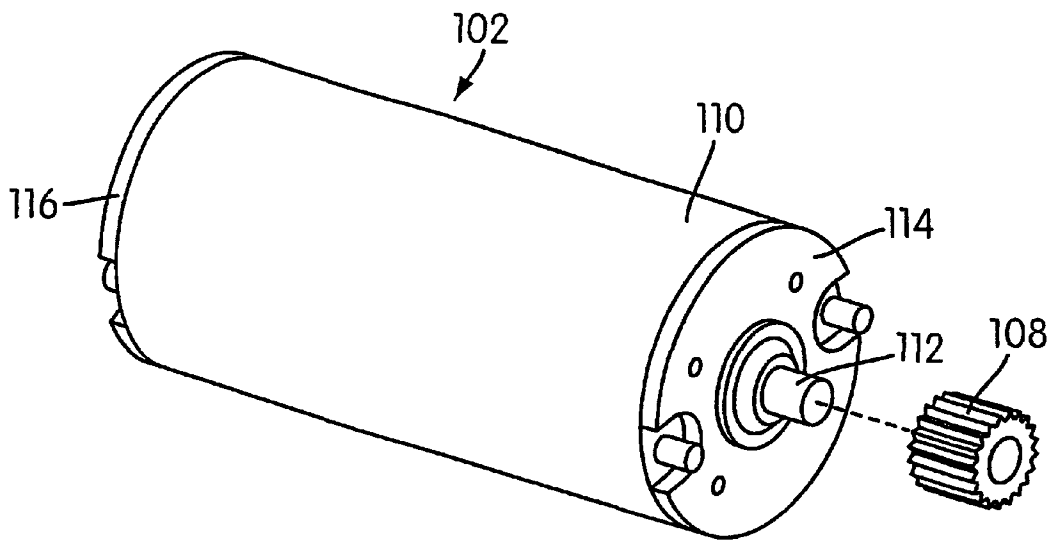
FIG. 4 is a perspective view of the electric motor showing the rotatable motor output member detached from the motor driveshaft.
Figure 5:
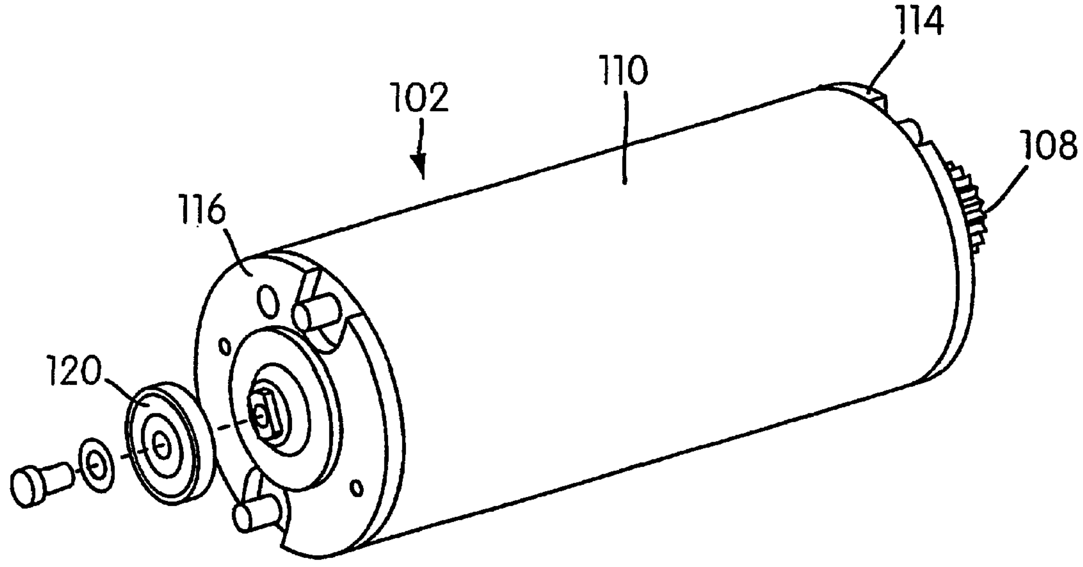
FIG. 5 is a perspective view of the electric motor showing the annular member detached from the motor driveshaft.

The motor 102 is shown in isolation in FIGS. 4 and 5. The D.C. motor 102 is housed in a cylindrical casing 110. A motor drive shaft 112 extends thorough front and rear wall portions 114, 116 of the casing 110 and is driven by an armature assembly 118 of well known construction (shown schematically inside the casing 110 in FIG. 3). The motor output member 108 is fixedly mounted to one end of the shaft 112. The preferred motor output member 108 is a spur or pinion gear.

An annular member 120 is fixedly mounted to an opposite end of the shaft 112 for rotation therewith. Individual portions of magnetic material are evenly spaced about the outer periphery of the annular member 120 and a metering device (not shown) is mounted adjacent the end of the motor casing 110. The metering device is a Hall effect sensor, which generates and transmits a signal to the controller 508 each time a portion of magnetic material passes by the device during rotation of the member 120. This signal is fed back to the controller 508 through conventional wires (not shown) to enable the controller 508 to monitor, for example, the angular speed of the motor shaft 112 and the angular position of the door panel 16 with respect to the door frame 12 based on the number and frequency of rotations of member 120. The construction and use of Hall effect sensors is well known in the art and will not be considered in detail in the present application. The invention may be practiced without the use of the Hall effect sensor.

The reduction transmission 200 is operatively connected in torque transmitting relation between the motor output member 108 and the operator output member 104. The reduction transmission 200 is constructed and arranged such that the transmission 200 rotates the operator output member 104 at a lower rotational speed than a rotational speed at which the motor 102 rotates the motor output member 108 and applies a higher torque to the operator output member 104 than a torque which the motor 102 applies to the motor output member 108.

Figure 6:
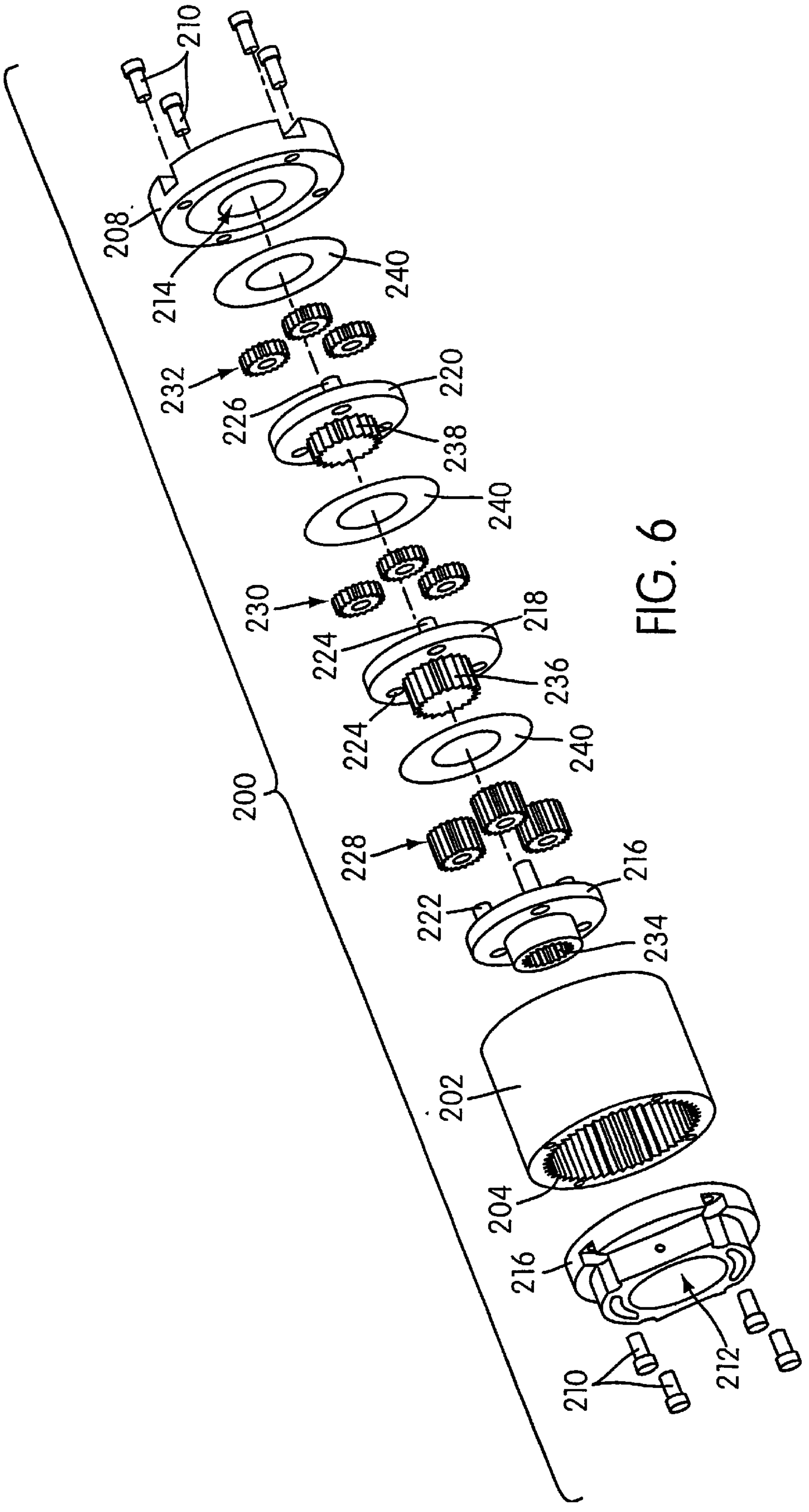
FIG. 6 is an exploded view of the reduction transmission of the axial operator.
Figure 7:
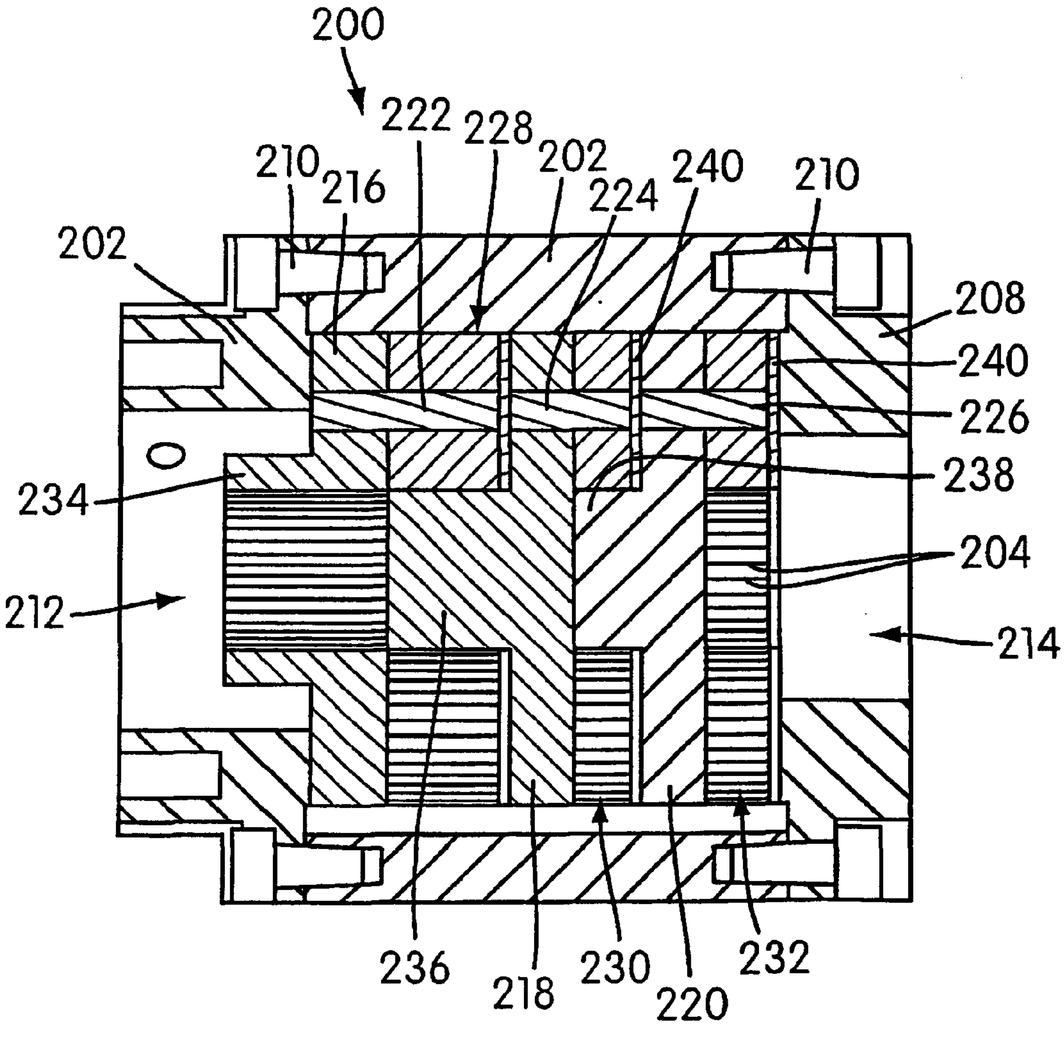
FIG. 7 is a sectional view of the reduction transmission.

The construction of the reduction transmission 200 can be best appreciated from FIGS. 6 and 7 which show the reduction transmission 34 in isolation from the remaining components of the operator. The reduction transmission 200 includes a generally cylindrical outer housing 202, the interior of which is splined to provide a set of axially extending gear teeth 64 defining a ring or orbit gear. Annular front and rear covers, 66 and 68, respectively, are secured to respective ends of the outer housing 202 with threaded fasteners 210 to close the front and rear ends of the housing 202. The covers 206, 208 each have a central opening 212, 214, respectively, to provide access to the interior of the reduction transmission 200.

Three planet gear carriers 216, 218, 220 are disposed inside the housing 202 and rotate about the operator axis OA. Each planet gear carrier 216, 218, 220 has a set of mounting portions in the form of planet gear mounting pins extending rearwardly therefrom. The three sets of mounting pins are designated 222, 224, 226, respectively. Each mounting pin of each set 222, 224, 226 extends generally in an axial direction from its respective planet gear carrier 216, 218, 220 so that each pin is generally parallel to the operator axis OA of the axial operator 100. Preferably, there are three pins in each set 222, 224, 226 and the pins of each set are circumferentially spaced evenly about the operator axis OA of the axial operator 100.

Three sets of three planet gears, generally designated 228, 230, 232, are rotatably mounted on the sets of planet gear mounting pins 222, 224, 226, respectively (such that one gear is mounted on each pin). Although the illustrated embodiment shows three carriers each carrying three planet gears, the number of carriers, the number of gears carried by any individual carrier and the diameters of the gears and carriers may be varied to achieve the desired reduction ratio.

In the illustrated embodiment, the speed reduction ratio achieved is approximately 42.6:1 from the input of the reduction transmission 200 to the output of the reduction transmission 200. The ratio may be increased for applications in door assemblies having door panels of greater weight which require more torque to move between open and closed positions. Conversely, the ratio may be decreased for door assemblies with lighter door panels, which require less torque to affect opening and closing movement.

Each planet gear carrier 216, 218, 220 has a carrier output member 234, 236, 238. The carrier output members 236, 238 of the rear and central carriers 218, 220 are provided by pinion gears integrally formed on the forward face of the respective carrier. The output member 234 on the forward carrier 216 is a splined bore having a series of axially extending, gear engaging teeth.

When the transmission 200 is assembled, the planet gears of each gear set 228, 230, 232 are intermeshed with the teeth 204 of the housing 202. When the operator 100 is assembled, the drive shaft 112 of the motor 102 extends through the opening 214 in the rear cover 208 and the axially extending teeth of the motor output member 108 are intermeshed with the teeth of the planet gears of set 232. Rotation of the motor output member 108 rotates the planet gears of set 232 about their respective axes (formed by the mounting pins 226) which causes the gear set 232 to travel circumferentially (i.e., revolve) about the operator axis (axis OA) in intermeshed relation with the teeth 204 of the housing 202. The circumferential travel of the planet gears of set 232 about the transmission axis causes the rear carrier 220 to rotate about the operator axis OA at a rate that is slower than the rate at which the motor output member 108 rotates about the axis OA.

The planet gears of the gear set 230 are intermeshed with both the output member 238 integrally formed on the rear carrier 220 and with the teeth 204 on the interior of the housing 202. Rotation of planet gear carrier 220 causes the planet gears of the gear set 230 to rotate about their respective axes (provided by mounting pins 224), which in turn causes the planet gears of the gear set 230 to travel circumferentially with respect to the operator axis OA in intermeshed relation with the teeth of the housing 202 (i.e., the orbit gear). This circumferential travel of the gears of gear set 230 rotates the central carrier 218 about the operator axis OA at a rate that is slower than the rotational rate at which the rear planet gear carrier 220 rotates about the axis OA.

In like manner, the planet gears of the gear set 228 are in intermeshed relation both with the teeth of the output member 236 of the central carrier 218 and with the interior teeth 204 of the housing 202 such that rotation of central planet gear carrier 218 rotates the planet gears of the gear set 228 about their respective axes (provided by the mounting pins 222), which in turn causes the planet gears of the gear set 228 to travel circumferentially with respect to the operator axis OA in intermeshed relation with the teeth 204 on the interior of the housing 202. As with carriers 218 and 220, this circumferential travel of the gear set 228 rotates the forward gear carrier 216 about the operator axis OA at a rate that is slower than the rotational rate at which the central planet gear carrier 218 rotates about the axis OA.

The reduction transmission 200 may be constructed without the use of intermeshed teeth. Instead, the various gears may be frictionally engaged with one another without the use of teeth. Metal washers 240 are provided to prevent frictional wear of the planet gear sets.

The operator output member 104 extends through the opening 212 in the front cover 206 and is received within the splined bore that defines the output member 234 of the forward carrier 216. The intermeshing of the teeth on a rearward end portion 122 of the operator output member 104 with the teeth of the output member 234 prevents angular displacement of the operator output member 104 with respect to the carrier 216 during power operated door movement so that the operator output member 104 and forward carrier 216 rotate about the operator axis OA as a single unit. As will become apparent, rotation of the operator output member 104 imparts torque to the linkage structure 600 to affect door panel movement. It can be appreciated that the output member 234 of the forward carrier 216 may be considered to function as the output of the reduction transmission 200.

Because each successive planet gear set 232, 230, 228 rotates more slowly than the previous output member (108, 238, 236, respectively) which drives the same, the rotational speed of the operator output member 104 at the output of the reduction transmission 200 is significantly lower than the rotational speed of the motor output member 108 secured to the shaft 112 of the motor 102. As a result, the torque at the output of the reduction transmission 200 is greater than the effective torque of the motor 102. The decease of the rate of rotation and increase in torsional force provided by the reduction transmission 200 allows high speed/low torque motors (which are less expensive and smaller than low speed/high torque motors) to be used to drive movement of doors having weights which the motor 102 alone could not effectively drive.

As is considered in greater detail below, a controlling system (including the controller 508 and the Hall effect sensor) communicated to the motor 102 of the axial operator 100 is operable to selectively control operation of the motor 102 so as to rotate the operator output member 104 in either the first or the second output rotational direction thereof to thereby move the door panel 16 toward and into either the open position thereof or the closed position thereof, respectively.

The reduction transmission 200 is secured to the motor 102 by a pair of axially extending threaded fasteners (not shown) that extend through the length of the motor casing 110 and that are received within threaded bores (not shown) formed in the rear cover 208 of the reduction transmission 200. The manner in which threaded fasteners are used to secure the reduction transmission 200 to the motor 102 is shown in each of U.S Patent application of Kowalczyk, et al., Ser. Nos. 09/631,106, 09/635,401, 09/497,729 and 09/497,730 which patent applications are hereby incorporated into the present application in its entirety for all material disclosed therein, including for exemplary constructions of the axial operator.

The reduction transmission 200 and the motor 102 (secured together by fasteners as described) are mounted within the cylindrical casing 106 by threaded fasteners that extend through the bottom of the cylindrical casing 106 and threadedly engage the casing 110 on the motor 102. The cylindrical outer casing 106 is a protective metal sleeve preferably formed either by extrusion or a roll-forming and seam-welding operation. Apertures (not shown) are formed in the outer casing 106 for passage of electrically conducting wires from the motor 102 to a source of power and from the Hall effect sensor to the controller 508.

It can be understood that because the axial operator 100 is relatively small and provides a relatively high reduction ratio (42.6:1 in the exemplary axial operator 100, as previously noted) in a compact package, the axial operator 100 can be easily installed in a door assembly in a wide variety of door assembly locations and orientations in operative association with the linkage structure 600.

Shown in FIG. 2, the door panel mounting structure 502 includes an axial operator-mounting bracket 510. The mounting bracket 510 is secured to door panel 16 proximate the upper hinge-side comer thereof with a plurality of threaded fasteners 512 inserted through apertures on a vertically arranged door attachment plate 514. An outwardly extending operator attachment plate 516 extends horizontally from the door attachment plate 514. An output member-receiving opening 517 formed through the operator attachment plate 516 allows the operator 100 to be secured thereto, with the operator abutting a downwardly facing surface of attachment plate 514 and the operator output member 104 extending vertically through the opening 517 beyond an upwardly facing surface 518. A plurality of threaded fasteners 520 pass through associated vertically extending openings within operator attachment plate 516 and engage within associated threaded recesses 522 within casing 106.

Referring to FIG. 2, it may be preferable for the retrofit door operating system 500 to include a manually operable clutch assembly 700. Clutch assembly 700 serves to operably couple operator output member 104 and linkage structure 600. Specifically, the clutch 700 is movable between (a) an engaged position wherein the clutch enables the operative connection between the operator 100 and the linkage structure 600 such that operation of the operator 100 under power affects the powered swinging movement of the door panel 16, and (b) a disengaged position wherein the clutch 700 disables the operative connection between the operator 100 and the linkage structure 600 to permit manual swinging movement of the door panel 16.

Figure 8:
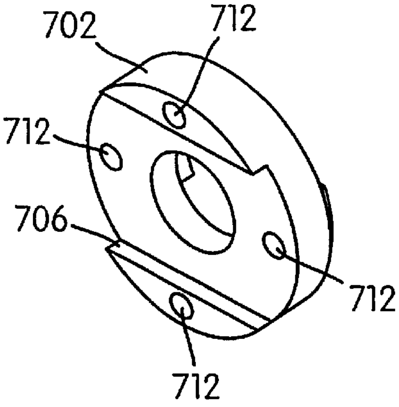
FIG. 8 is a perspective view showing an upper surface of the first clutch member.

Clutch assembly 700 includes a first clutch member 702 and a second clutch member 704. First clutch member 702 is fixedly attached to an end of an arm 601 of the linkage structure 600. As shown in FIGS. 2 and 8, a laterally extending groove 706 serves to accept the end of the arm 601 of the linkage structure 600 therein. Shown in FIG. 2, a retaining element 708 is secured to first clutch member 702 in overlaying relation to the associated end of the arm 601 thereby retaining the associated end of the arm 601 within groove 706. The retaining element 708 is secured to an upwardly facing side of the first clutch member 702 by a plurality of threaded fasteners 710. As shown in FIG. 2, it may be necessary for one or more of the threaded fasteners 710 to pass through bores in the arm portion 601 to properly securely attach the retaining element 708 to the first clutch member 702.

Figure 9:
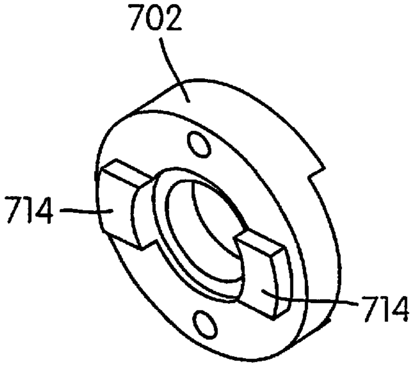
FIG. 9 is a perspective view showing the lower surface of the first clutch member.
Figure 10:
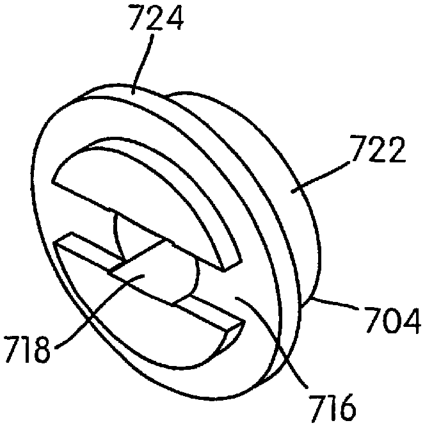
FIG. 10 is a perspective view showing the upper surface of the second clutch member.

As shown in FIG. 9, a downwardly facing side of first clutch member 702 includes a pair of diametrically spaced downwardly extending lug elements 714. During normal operation of the retrofit door operating system 500, the lugs 714 are disposed within a laterally extending groove 716 provided on an upper side of the second clutch member 704. It is also contemplated that first and second clutch members 702, 704 may comprise opposing clutch friction disks. In a case utilizing such friction clutch disks, during normal operation, the opposing disks will be in frictional engagement.

As stated previously, operator output member 104 extends vertically past an upwardly facing surface 518 of operator attachment plate 516. Second clutch member 704 is mounted on the operator output member 104, such that second clutch member 704 is non-rotatable with respect to output member 104, but is capable of limited axial movement with respect to output member 104. Specifically, the second clutch member 704 has a central opening 718 which is received over the upper free end 524 of operator output member 104. The opening 718 and the end 524 of the operator output member have corresponding non-circular shapes that prevent relative rotational movement therebetween yet allow limited relative axial movement.

A compression spring 720 is disposed in surrounding relation about an axially extending portion 722 of second clutch member 704. A first end of the compression spring 720 engages a radially outwardly extending annular flange 724 provided by second clutch member 704. A second end of compression spring 720 engages the upwardly facing surface 518 of the operator attachment plate 516. The spring 720 biases the second clutch member 704 into coupled engagement with the first clutch member 702, thus biasing the clutch 700 into its engaged position.

Although the clutch 700 in the illustrated embodiment is preferred, the clutch may have any construction or design and the illustrated example thereof is not intended to be limiting.

Preferably, the clutch 700 incorporates a releasable locking mechanism (not shown) that automatically locks the clutch 700 in its disengaged position until the user releases the locking mechanism to allow the clutch to be returned to the engaged position thereof. For example, a spring biased pawl could be provided to engage the handle structure 732 or the second clutch member 704 to maintain the second clutch member 704 out of engagement with the first clutch member 702. The advantage of providing such a locking mechanism is that it makes the clutch mechanism easier to use. Specifically, the user does not have to maintain the clutch 700 in its disengaged position with one hand while opening the door panel 16 with the other because the locking mechanism functions to maintain the clutch 700 in its disengaged position.

In the illustrated embodiment, the arm portion 601 of the linkage structure 600 is substantially flat and elongated in configuration. This design provides adequate lateral stiffness, needed to transfer torque from the operator output member 104 to the wall mounting structure 504 and maintains a low profile for the linkage structure 600. As stated above, one end of the arm 601 is non-rotatably mounted to the first clutch member 702. An opposite end of the linkage structure 600 includes a pivotal connection member 726 that defines a linkage pivotal axis LA. Pivotal connection member 726 has an axially extending portion 728 that threadedly engages a threaded opening 730 in linkage structure 600. Another portion of the pivotal connection member 726 is operatively connected to another arm portion 530 of the linkage structure.

Figure 12:
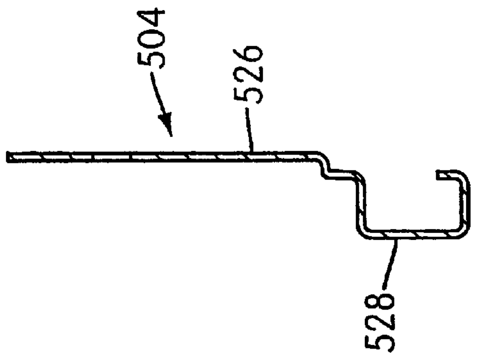
FIG. 12 is a sectional view of the wall mounting structure taken along line 12—12 in FIG. 11.
Figure 11:
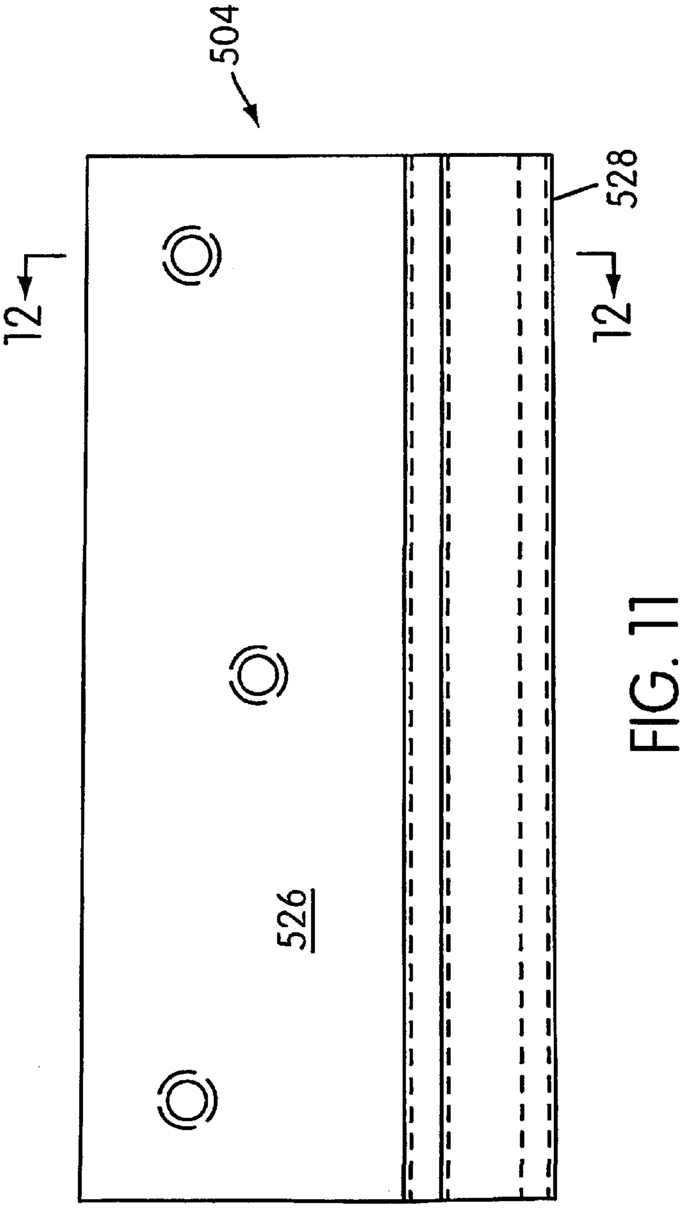
FIG. 11 is a top plan view of the wall mounting structure.

Wall mounting structure 504 is fixedly secured to the building wall 14. Preferably, the wall mounting structure 504 is attached to the door frame 12, but in alternative designs it may be directly mounted to the wall 14. In the illustrated embodiment, the wall mounting structure 504 is a frame mounting bracket that includes a substantially flat frame attaching member 526 that is attached along an upper edge of the inner periphery of the door frame 12. The attaching member 526 extends laterally with respect to door frame 12 and is fixedly secured thereto with a plurality of threaded fasteners 528. A portion of the frame attaching member 526 is deformed to provide a lateral slide channel 528 that slidably receives the arm portion 530 of the linkage structure 600 therein. In the illustrated embodiment, the arm portion 530 acts as a slide member that slides rectilinearly within the slide channel 528. Shown in FIGS. 11 and 12, wall mounting structure 504 may be formed from a single piece of metallic sheet material. The slide channel 528 may be formed by bending the metallic sheet into the desired configuration, such as that shown in FIG. 12, to form the channel 528 within which slide member 530 may be disposed.

The slide member 530 may include a polymer insert member 532 to which pivotal connection member 726 is connected. Insert member 532 serves as a cushion to reduce jarring movement of the door panel 16 as axial operator 100 opens or closes door panel 16. It is also contemplated that insert member 532 may be formed of a metallic material, or that the pivotal connection member 726 may be connected directly to slide member 530. Preferably an E-clip or a C-clip, shown at 732 in FIG. 2, is fastened to an uppermost end of pivotal member 726 to retain the pivotal member 726 in connection with the slide member 530.

A pair of end caps 534 prevent the slide member 530 from sliding out of slide channel 528 and provide the wall mounting structure 504 with an enhanced aesthetic appearance.

It is preferable that slide channel 528 is sufficient in length such that slide member 530 has sufficient travel to allow door panel 16 to be fully opened and fully closed. Furthermore, it is preferable that a portion of the frame attaching member 526 that attaches to the frame 12 be of the same length as the portion defining the slide channel 528 to provide sufficient support to the channel 528.

Although the illustrated example of a linkage structure 600 is preferred because it is economical and functions to effect the requisite transferal of force from the operator 100 in a compact design, it should be understood that the linkage structure 600 may be any arrangement capable of linking the operator 100 to the door panel 16 in such a manner that operation of the operator 100 affects movement of the door panel 16.

The door mounting structure 502 also includes a controller-mounting bracket 550, shown in FIG. 2. Mounting bracket 550 is attached to door panel 16 by a plurality of threaded fasteners 552. Mounting bracket 550 is further connected to operator-mounting bracket 510 by a pair of threaded fasteners 554. Mounting bracket 550 is situated underneath mounting bracket 510 and is disposed between door panel 16 and axial operator 100. Controller 508 is mounted to an outwardly facing surface of the mounting bracket 550. Mounting bracket 550 further includes a outwardly extending portion 556 protruding from a bottom portion thereof and below the operator 100.

Figure 13:
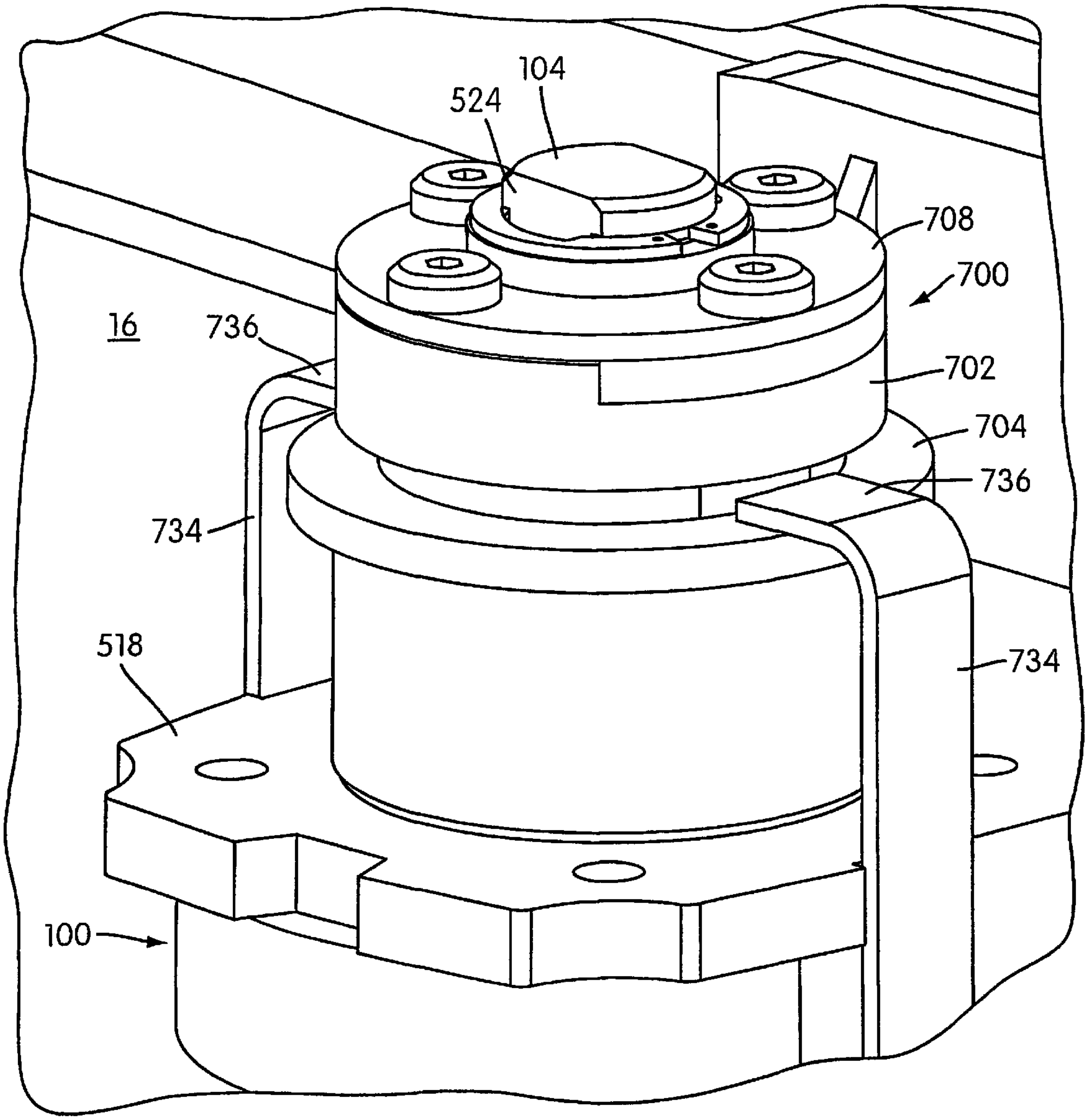
FIG. 13 is a perspective view of the clutch showing the first clutch member engaged with the second clutch member.
Figure 14:
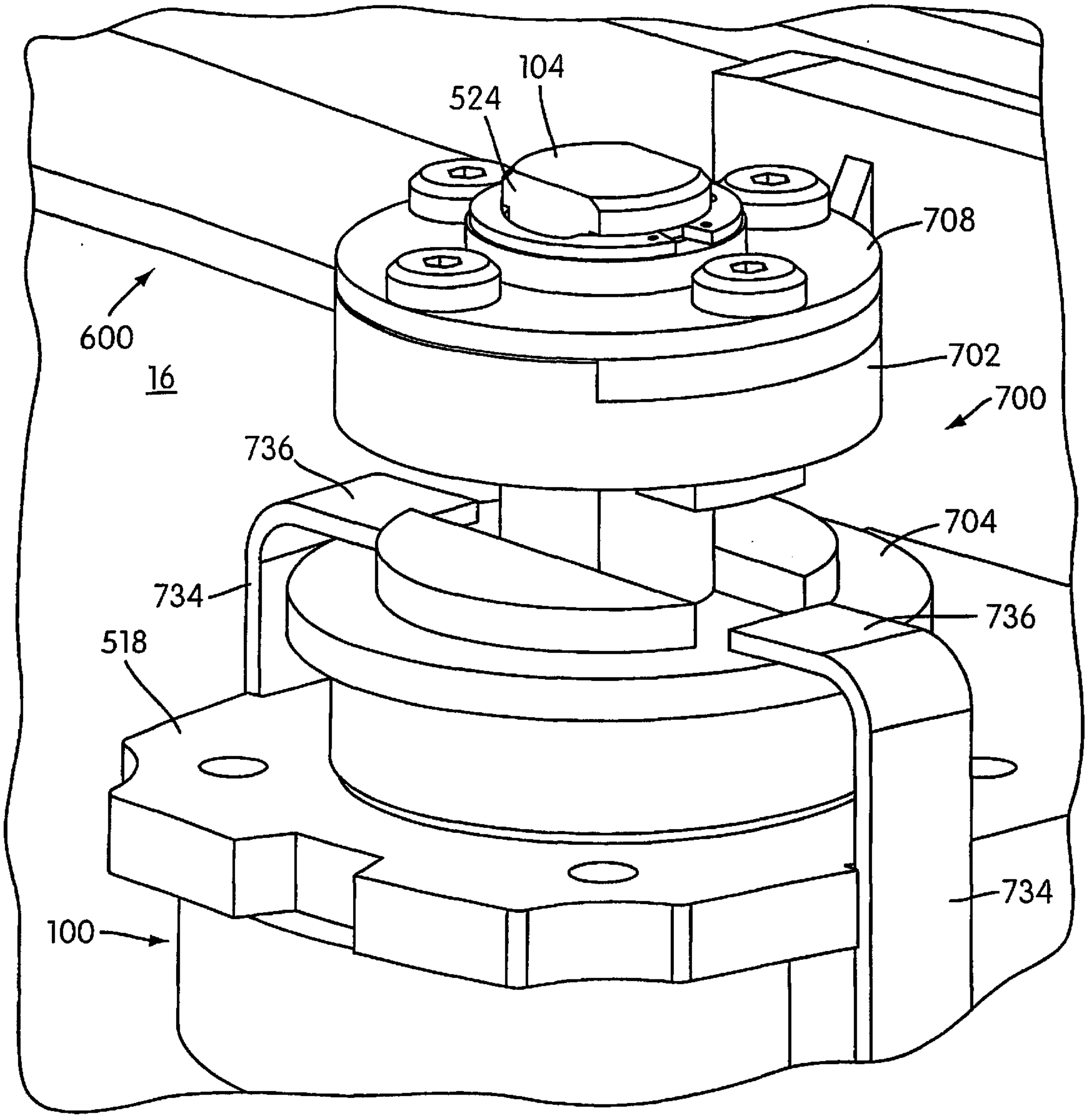
FIG. 14 is a perspective view of the clutch showing the first clutch member disengaged from the second clutch member.

A manually engagable release member allows the clutch 700 to be disengaged in an emergency situation when it is desirable to manually bypass the axial operator 100 to allow the door panel 16 to be manually opened or closed. The manually engagable release member includes a handle structure 732 that has a pair of interconnecting members 734. Interconnecting members 734 are disposed on opposite sides of operator 100 and extend downwardly from the second clutch member 704 to a position below operator 100 and also below portion 556 of bracket 550. Each interconnecting member 734 includes a second clutch member-engaging portion 736 that engage the second clutch member 704. It is preferable to form second clutch member-engaging portions 736 by bending upper ends of associated interconnecting members 734 to a horizontally extending, confronting arrangement, shown in FIGS. 13 and 14. Interconnecting members 734 pass through respective vertically extending openings 558 in the outwardly extending portion 556. The vertically extending openings 558 provide horizontal support to the interconnecting members 734 and serve as guides for vertical movement of the interconnecting members 734.

Figure 15:
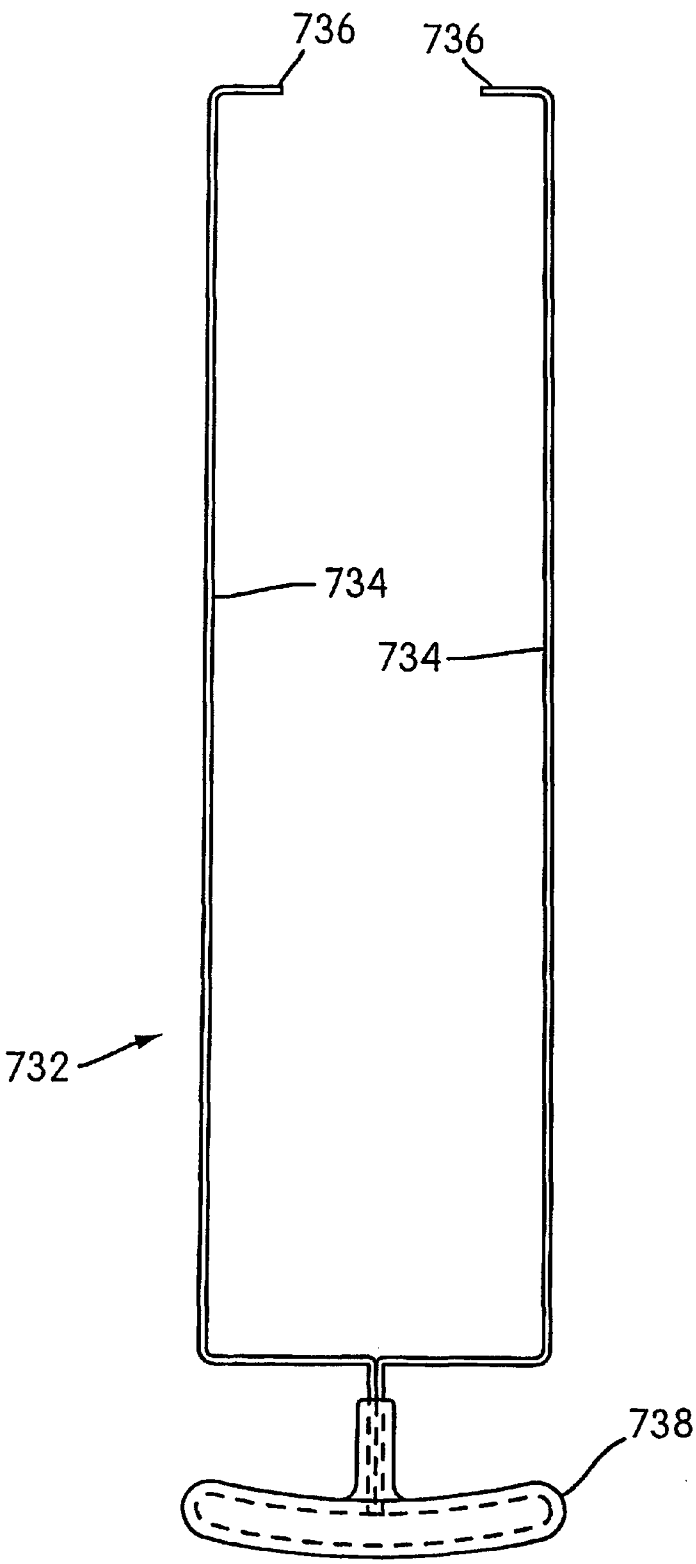
FIG. 15 is a side plan view of the handle structure.

The handle structure 732 may include a handle grip portion 738 to allow a user to manipulate the manually engagable release member. In the illustrated embodiment, the lower ends of the interconnecting members 734 are bent such that the lower ends contact one another and are connected to each other, preferably by rivets or spot welding. The handle grip portion 738, formed preferably of polycarbonate material, is over-molded on the intersecting lower ends of the interconnecting members 734, as shown in FIG. 15. With this arrangement, to move the clutch 700 to its disengaged position, the user applies a downwardly directed force on the handle grip portion 738 to thereby move the second clutch member 704 downwardly against the biasing of spring 720 and affect disengagement of the clutch 700. In another embodiment of the handle structure 732, shown in FIGS. 16 and 17, the lower ends of the interconnecting members 734 are bent to a horizontally confronting configuration. An arcuate handle grip portion 738', formed preferably of polycarbonate material, is over-molded on the lower ends of the interconnecting members 734 of this embodiment. The specific configuration of the release member is not critical to the present invention and the invention may be practiced with a release member of any construction or configuration.

The retrofit door operating system 500 may also include an electric strike 800 to facilitate locking and unlocking the door panel 16 with respect to the door frame 12. The electric strike herein contemplated is the type disclosed in U.S. Pat. No. 3,861,727, which is hereby incorporated by reference into this patent application for the present invention.

Figure 18:
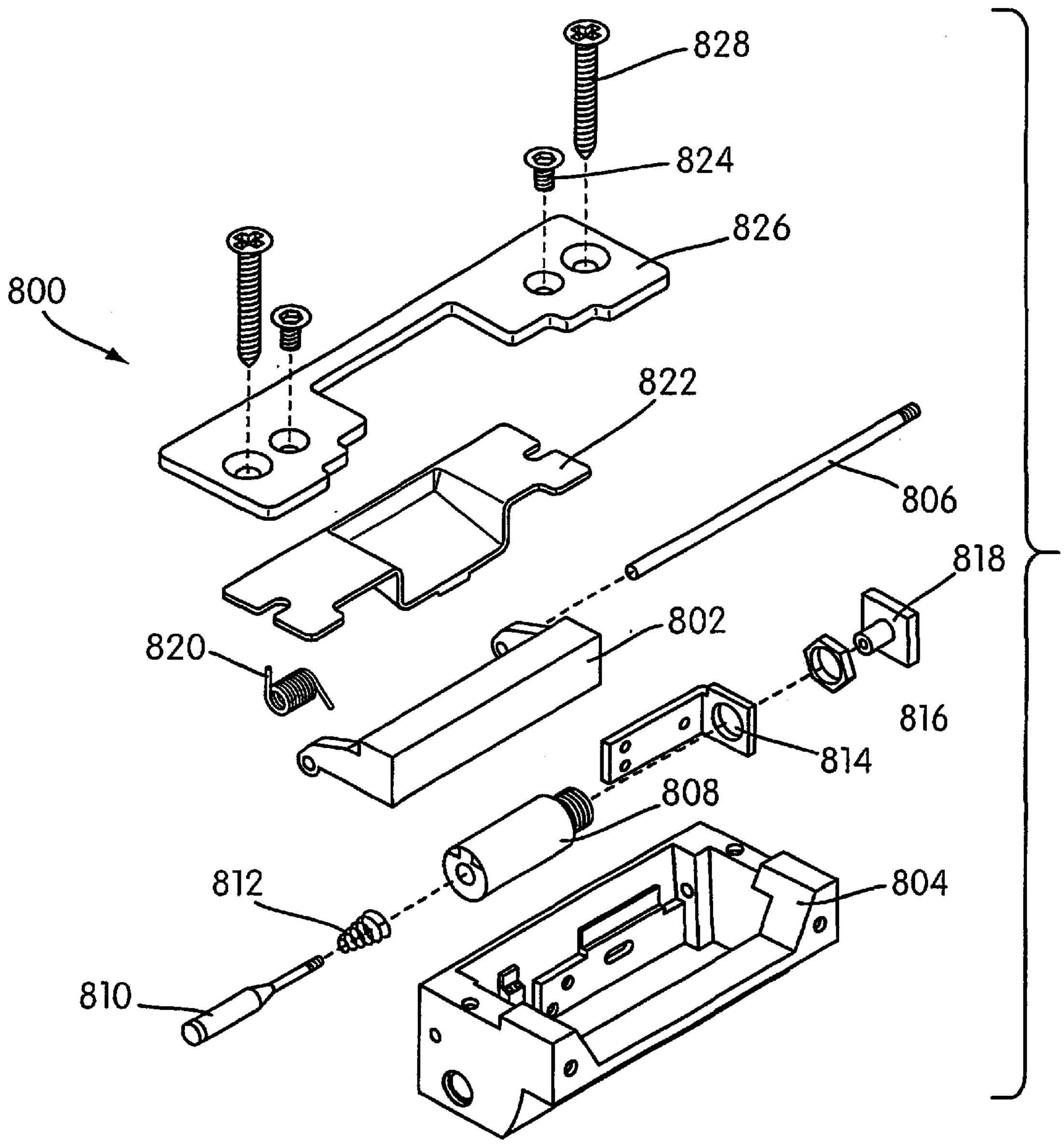
FIG. 18 is an exploded view of the electric strike.

The electric strike 800 is operatively connected to the controller 508 so that the controller 508 can selectively activate or deactivate the electric strike 800 based on signal (s) received from the input device 506. As shown in FIG. 18, the electric strike 800 includes a strike member 802 that is pivotally mounted within a casing 804. A pivot pin 806 serves to connect the strike member 802 to the casing 804. A solenoid 808 includes a plunger 810 and a return spring 812. The solenoid 808 is mounted within the casing 804 by a bracket 814 that is fixedly attached to the casing by a plurality of threaded fasteners (not shown). The solenoid 808 is disposed within a central opening within the bracket 814 and is secured with a threaded nut 816. A blocking member 818 is threadedly attached to one end of the plunger 810. When the solenoid 808 is energized, the blocking member 818 is moved to a blocking position wherein it blocks strike member 802 from pivotal movement, effectively locking the bolt on the door panel 16 therein and preventing the door panel 16 from being opened. When the solenoid 808 is deenergized, the return spring 812 biases the plunger 810 in a direction such that blocking member 818 is moved to a releasing position wherein it is clear of strike member 802 and allows the strike member 802 to pivot inwardly into the casing 804, effectively unlocking the bolt on the door panel 16 and allowing the door panel to be opened. A biasing spring 820 biases the strike member 802 with respect to the casing 804 such that the strike member 802 is urged toward a normal engaging position wherein the strike 802 retains the bolt on the door panel 16 therein. A strike plate 822 is mounted to the casing 804 with a pair of threaded fasteners 824 and cooperates with the strike member 802 to form the recess within which the door bolt is disposed when the door panel 16 is in a closed position. A face plate 826 is mounted to the door frame 12 with a pair of threaded fasteners 828 in covering relation to the casing 804.

As stated previously, the controller 508 is communicated to the motor 102 of the axial operator 100 to commence rotation of the motor and affect movement of door panel 16 upon the appropriate signal from the input device 506. Further, the controller 508 is communicated to the electric strike 800 such that, upon the appropriate signal from the input device 506, the controller may energize or deenergize the solenoid 808 to cause the door panel 16 to be locked or unlocked with respect to the door frame 12.

Figure 19:
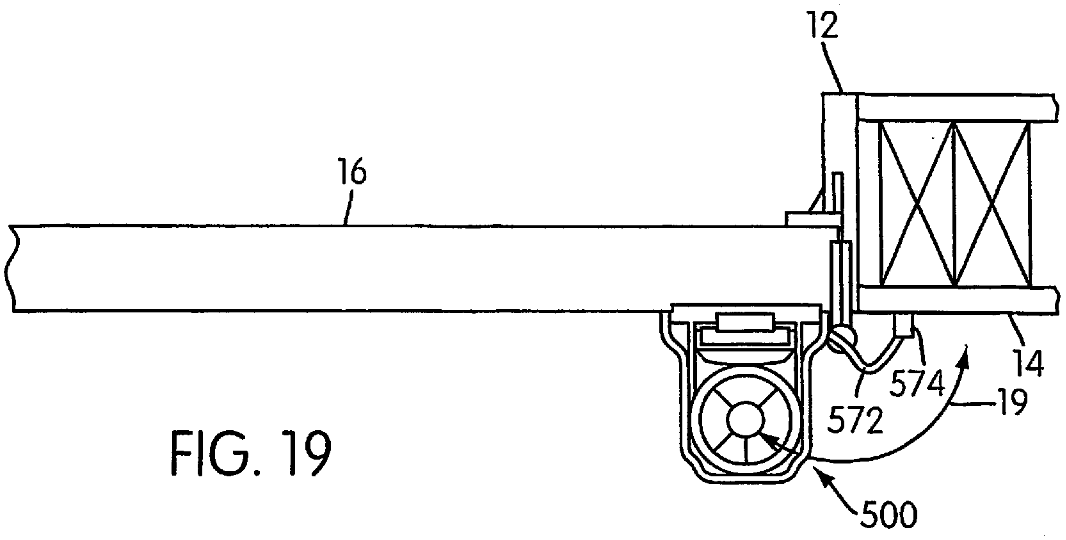
FIG. 19 is a top plan view of the retrofit power operated door operating assembly installed on a door showing the assembly and door in a closed position.
Figure 20:
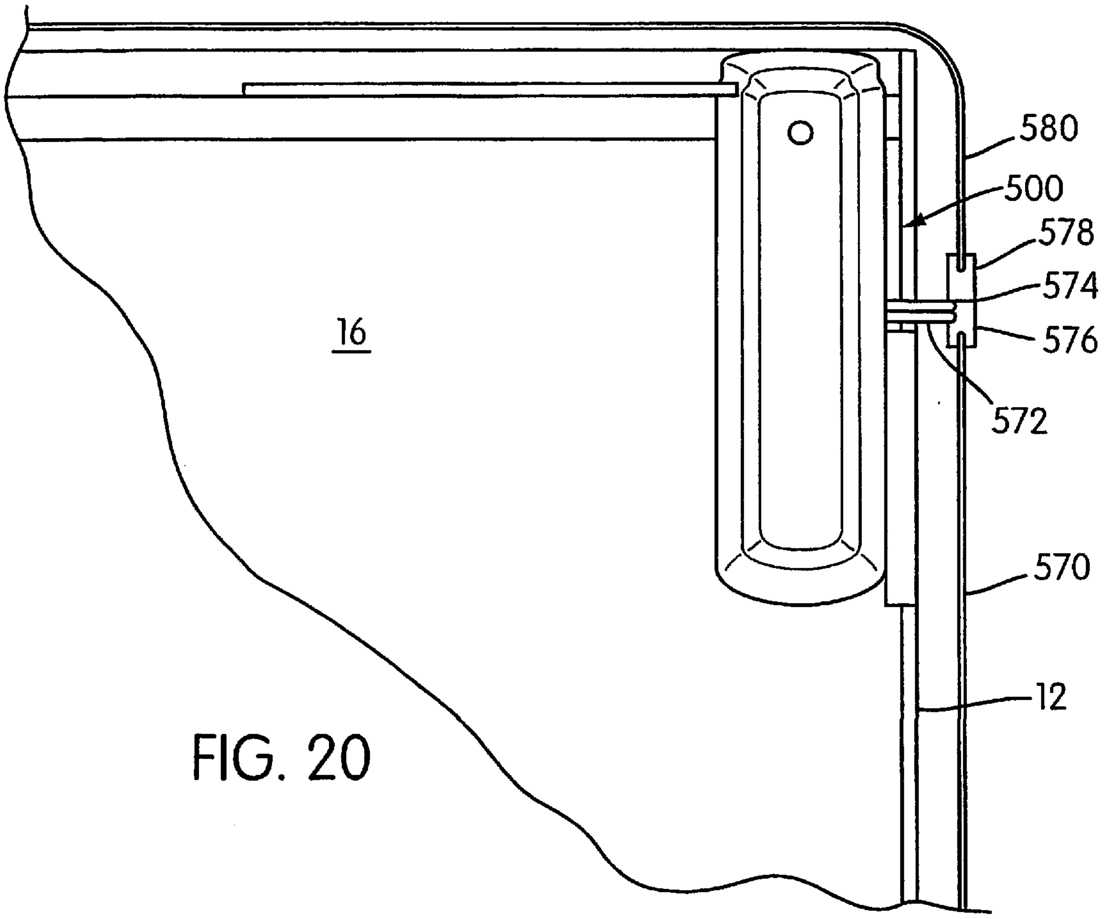
FIG. 20 is a detailed elevated front view of the manual swing door assembly with the retrofit power operated door operating assembly installed thereon.

As shown in FIG. 1, the retrofit door operating system 500 is supplied with electrical power via an electrical power supply cord 570 extending between a wall-mounted electrical socket 18 and the controller 508. It is contemplated that either the controller 508 or electrical power supply cord 570 may include a transformer to allow the AC current supplied by the wall-mounted electrical socket 18 to DC current, as used by the motor 102. As shown in FIGS. 19 and 20, a flat flexible cable 572 connects the controller 508 to a connecting terminal 574, which is mounted to the building wall 14 immediately adjacent the edge of the door frame 12. The electrical power supply cord 570 connects to a first pair of positive and negative terminals 576, which is communicated to controller 508 by two of the wires in the flat flexible cable 572. A second pair of positive and negative terminals 578 communicates with the controller 508 by an additional two wires in the flexible cable 572. An opposite end of electrical cord 580 is connected to the solenoid 808 of electric strike 800. The configuration of the flexible cable 572 is such that the door panel 16 may be moved between the open and closed positions without interference from the flexible cable 572. Specifically, all the wires in the flexible cable 572 are arranged in a planar, parallel array, which provides the cable with a low profile and compact arrangement that is difficult to obtain with cables that have circularly arranged wires.

Figure 21:
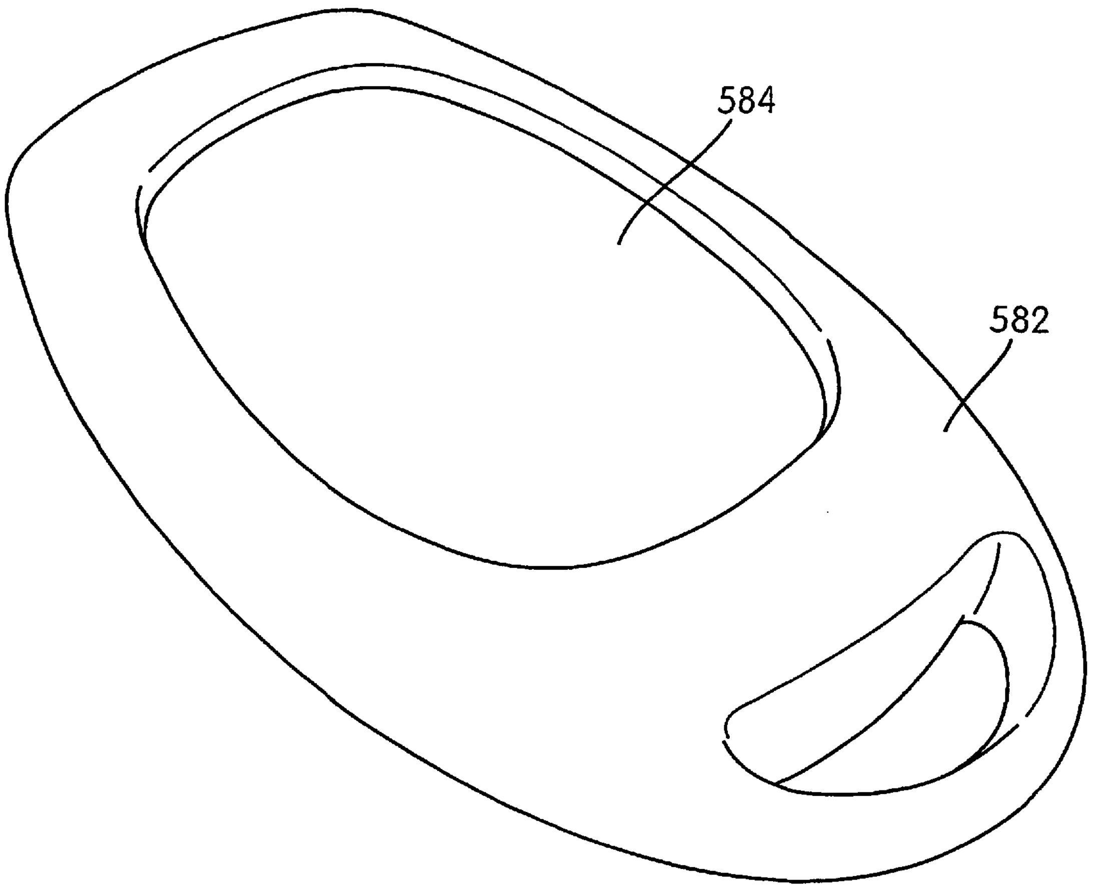
FIG. 21 is a perspective view of the remote transmitter.

The input device 506 may be in the form of a remote transmitter 582, as shown in FIG. 21, that is adapted to be carried by a person. The remote transmitter 582 includes a manually actuated switch 584 that allows the user to send a door movement signal to a receiver 586. The receiver 586 is adapted to assess the validity of the door movement signal (e.g., determine if the received signal is valid or appropriate). That is, the receiver 586 (or the controller 508) analyzes the door movement signal to determine whether it carries a code that matches a predetermined code provided to the receiver 586 (or controller 508). The controller 508 then carries out instructions prescribed by the door movement signal. For example, with the door 12 closed and the strike 800 in the locking position thereof, the user can use the transmitter 502 to transmit a valid door opening signal to the receiver 586. Based on receiving this signal, the controller 508 then responsively deenergizes the strike 800 to release the door panel 16 and then begins the operation of the operator 100 to move the door panel 16 in the opening direction. Alternatively, the system could be configured such that the transmitter transmits a door unlocking signal separate from the door opening signal. In this configuration the user could first transmit the valid unlocking signal with the transmitter 582 (thus causing the controller 508 to deenergize the strike 800) and then transmit a subsequent valid door opening signal (thus causing the controller 508 to actuate the operator 100 for opening movement of the door panel 16). The door movement signal may also be a door closing signal that causes the controller 508 to actuate motor 102 to move the door panel 16 towards and into its closed position. Once closed, the controller then energizes the electric strike 800 to move the same into its locked position, effectively locking the door panel 16 with respect to door frame 12. It is also contemplated that the remote transmitter may transmit separate door closing and unlocking signals, which would require a user to depress a switch for closing the door panel 16 and locking the electric strike 800.

It should be noted that the controller 508 functions to monitor the door panel position using feedback generated by the Hall effect sensor. The controller 508 uses this information to vary the speed of the motor (and hence the speed of door panel movement) during various phases of the door panel's range of movement. For example, as the door panel moves in the closing direction and is near the closed position, the controller 508 slows down the motor speed so that the last few inches of door panel travel are at a reduced speed. This helps to reduce the likelihood of objects being trapped between the door panel 16 and frame 12 during door closing. Also, the controller 508 may be programmed to monitor the motor speed via the Hall effect sensor in relation to the amount of power being delivered to the motor. By comparing this information, the controller 508 can determine whether the door panel 16 has encountered and obstruction and then responsively stop delivery of power to the motor (or reverse the motor entirely).

It is contemplated that other types of input devices may also be possible. For instance, a wall-mounted key pad (not shown) may be utilized to produce the door movement signal(s). In this case, the wall-mounted key pad may be connected to the connecting terminal 574 by a separate electrical cord that serves to convey the door movement signal to the receiver 586. To prevent unauthorized access, the user must enter a valid access code into the key pad prior to operating the system.

A cover 588 attaches to the operator-mounting bracket 510 with a threaded fastener 590. The cover 588 serves to surround and enclose the majority of the retrofit door operating system 500 to reduce dirt and dust contamination thereof and provide a more aesthetically pleasing appearance by concealing the internal components of the system. A horizontal slot 592 in the upper end of the cover 588 allows the arm portion 601 to pivotally move therein while the door panel 16 moves between the closed and open positions.

OPERATION

To install the system 500, the wall mounting structure 504 is mounted to the upper inner edge of frame 12 as shown and the door panel mounting structure 502 is mounted to the door panel upper corner as shown with the linkage structure 600 extending therebetween. The linkage is preferably distributed to the end user pre-connected to the wall and door mounting structures 502, 504; but it may be separate, thus requiring the additional steps of attaching the linkage structure 600 to the wall and door mounting structures 502, 504. The connecting terminal 574 is connected to the wall adjacent the frame 12 and the flat cable 572 is connected between the controller 508 and the terminal 574 as described above. The user routs out the portion of the door frame 12 where the existing strike is and mounts the electric strike 800 into the routed opening. Then, the low voltage wiring 580 is ran along the outer edge of the door frame 12 and connected at one end to the solenoid of the strike 800 and at the other end to the connecting terminal 574. Preferably, a plurality of fasteners, such as staples, are used to secure the low voltage wiring 580 to the outer edge of the door frame 12. The power supply cord 570 is then plugged into a live electric outlet to provide power to the system 500.

Upon receipt of the door movement signal that includes the instruction for the controller 508 to actuate the electric motor 102, the rotatable motor output member 108 is rotated in the dictated direction. The rotatable operator output member 104 is also rotated, but at a speed lower than the speed of the motor output member 108 and a torque greater that the torque of the motor output member 108 as defined by the gear ratio of the reduction transmission 200. The rotatable operator output member 104 in turn affects the rotation of first and second clutch members 702, 704 (assuming the clutch is in the engaged position). The operator 100 drives the linkage structure 600, which in turn affects powered swinging movement of the door panel 16.

Figure 16:
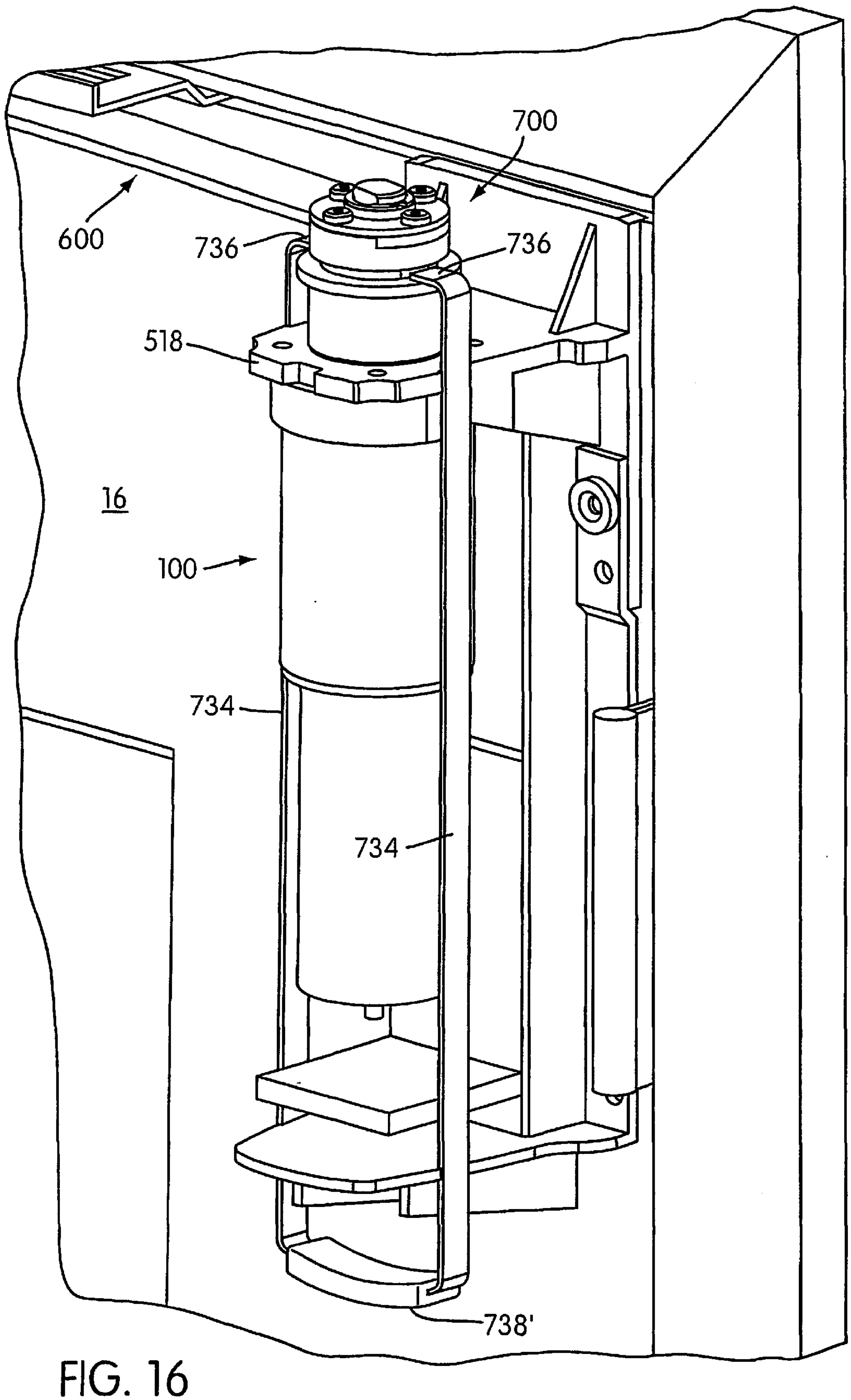
FIG. 16 is a perspective view of the retrofit power operated door operating assembly installed on a door showing the assembly and door in a closed position.
Figure 17:
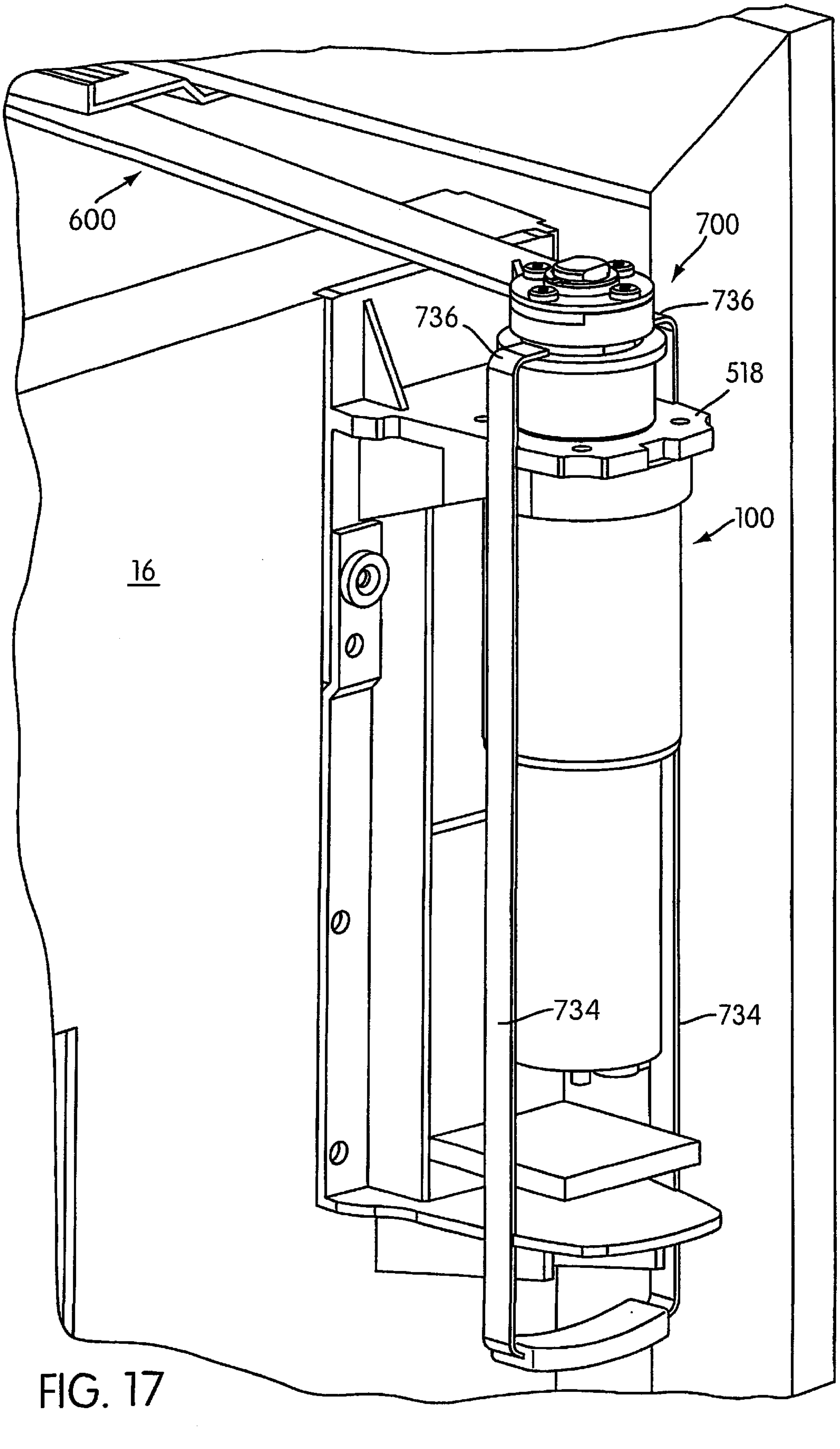
FIG. 17 is a perspective view of the retrofit power operated door operating assembly installed on a door showing the assembly and door in an open position.

From the closed position towards the open position, the arm 601 of the pivoting linkage structure 600 pivots in a direction opposite to the direction the door panel 16 moves. For example, FIGS. 16 and 19 show the door panel 16 in a closed position. In this case, the door panel 16 pivots counter-clockwise from the closed position to the open position. Therefore, to effect movement of the door in the counter-clockwise direction, the operator 100 pivots the linkage structure 600 in a clockwise direction. It is noted that the arc 19, in FIG. 19, represents the path the operator axis OA travels about the door axis DA as the door panel 16 moves between the closed position and the open position. The sliding nature of the connection between the wall mounting structure 504 and the sliding arm 530 of the linkage structure 600 allows the arm 530 to slide rectilinearly within slide channel 528 toward the hinge side of the door panel 16, as the door panel is moved in the opening direction.

From the open position towards the closed position, the door panel 16 moves clockwise towards the closed position. Therefore, the operator 100 pivots the arm 601of the linkage structure 600 in a counter-clockwise direction to impart the clockwise movement of the door panel 16. The sliding arm 530 moves within the slide channel 528 away from the hinge side of the door panel 16, as the door panel is moved in the closing direction.

It is noted that the user may resist and prevent movement of the door panel 16 against the force produced by the axial operator 100, as the retrofit door operating system 500 attempts to move the door panel 16 toward the closed or open position. It is also noted that the user may manually effect movement of the door panel 16 while the retrofit door operating system is not in operation, since the axial operator 100 does significantly limit manually imparted rotatable motion of the door panel 16. It may however be preferable to disengage the axial operator 100 to allow free movement of the door panel 16. The handle structure 732 allows the user to manually move the clutch 700 to the disengaged position thereof. Shown in FIG. 1, by effecting a downwardly directed movement of handle grip portion 738 (or 738') the second clutch member 704 may be uncoupled from the first clutch member 702 and as such any resistance of the axial operator 100 is bypassed.

The preferred application of the illustrated system is installation on pre-existing manual swing door assemblies on residential structures. The term residential structures is not limited solely to residential homes or apartments, and is intended to include other structures that could be considered both commercial and residential in nature, such as individual hospital rooms, individual rooms at elderly care facilities or nursing homes, individual hotel/motel rooms and other such locations where it is advantageous to have power operated doors that are economical and relatively easy to install.

One advantage of the illustrated embodiment is that it can be installed on both right and left-handed swing door assemblies without any modification. Specifically, the overall design can be considered as being functionally symmetrical or "non-handed" because its configuration when mounted on a right-handed assembly is functionally a mirror image of its configuration when mounted on a left-handed assembly. However, the invention may be practiced in a design without this advantage.

In an alternative embodiment of the design, the operator 100 and control system could be mounted on the wall 14 or the door frame 12 instead of on the door panel 16.1 However, the combination of the axial operator 100 mounted on the door panel 16 as illustrated is preferred for aesthetic appearance purposes. Specifically, because the axial operator 100 has a relatively greater axial extent in comparison to its radial extent, and the door panel 16 has a relatively greater vertical extent than widthwise extent, the presence of the axial operator 100 on the door panel 16 appears less obtrusive and provides for an overall better appearance. By way of comparison, if the axial operator 100 were mounted, for example, above the door frame 12, the vertical extent of the operator 100 provides for a poor aesthetic appearance. Specifically, the vertical axial operator 100 on the door panel 16 appears to fit within the overall shape of the door panel, whereas the vertical axial operator 100 above the door frame 12 appears to protrude from the frame 12, giving the whole swing door assembly an awkward appearance.

It can thus be appreciated the foregoing objectives of the invention have been fully and effectively accomplished. The foregoing illustrated embodiment has been provided to illustrate the structural and functional principles of the present invention and is not intended to be limiting. To the contrary, the present invention is intended to encompass all modifications, changes and alterations within the spirit and scope of the following claims.

What is claimed:

1. A retrofit power-operated door operating system for installation on a manual swing door assembly, said door assembly comprising a frame mounted to a building wall and a swinging door panel manually movable in a swinging manner with respect to said door frame between opened and closed positions thereof by manual force, said retrofit door operating system comprising:

a door panel mounting structure constructed and arranged to be mounted to the door panel;

wall mounting structure constructed and arranged to be mounted to the building wall;

a linkage structure connected between said door panel mounting structure and said wall mounting structure;

an axial operator comprising:

an operator output member rotatable about an operator axis that extends generally vertically when said system is installed on the swing door assembly, said operator output member and said linkage structure being constructed and arranged such that, when said system is installed on the swing door assembly, rotation of said operator output member drives said linkage structure to move said wall and door panel mounting structures relative to one another to affect powered swinging movement of the door panel between the open and closed position thereof aforesaid;

an electric motor connectable to an electric power supply, said motor having a motor output member rotatable about said operator axis and being constructed and arranged to rotate said motor output member about said operator axis;

a planet gear reduction transmission connected between said motor output member and said operator output member, said reduction transmission being constructed and arranged such that said transmission rotates said operator output member at a lower rotational speed than a rotational speed at which said motor rotates said motor output member and applies a higher torque to said operator output member than a torque which said motor applies to said motor output member;

said reduction transmission comprising (a) an orbit gear arranged generally coaxially with respect to said operator axis, (b) a planet gear carrier positioned radially inwardly of said orbit gear and arranged for rotation about said operator axis, said planet gear carrier having a mounting portion offset generally radially from said output axis, and (c) a planet gear rotatably mounted to the mounting portion of said planet gear carrier such that said planet gear rotates about a planet gear axis that extends through said mounting portion generally parallel to said operator axis;

said planet gear being operatively connected to said motor output member and engaged with a radially inwardly facing interior surface of said orbit gear such that rotation of said motor output member rotates said planet gear relative to said planet gear carrier about said planet gear axis which in turn causes said planet gear to roll along the interior surface of said orbit gear in a generally circumferential direction with respect to said operator axis, thereby rotating said planet gear carrier about said output axis at a lower rotational speed and at a higher torque than the rotational speed and torque at which said motor rotates said motor output member;

said planet gear carrier being operatively connected to said operator output member such that rotation of said planet gear carrier as a result of said planet gear being rotated by said motor output member as aforesaid rotates said operator output member as aforesaid to affect said relative movement between said frame and door panel mounting structures;

an input device operable to generate a door movement signal; and a controller communicated to the motor of said axial operator, said controller being operable responsive to receiving said door movement signal to control operation of said motor so as to selectively cause said motor to rotate said motor output member and thereby rotate said operator output member as aforesaid to affect said powered swinging movement of the door panel between the opened and closed positions thereof.

2. The system according to claim 1, wherein said linkage structure comprises first and second arm portions movably connected to one another.

3. The system according to claim 2, wherein said axial operator is connected to one of said wall and door panel mounting portions, wherein said first arm portion is connected to said operator output member such that said first arm portion is indirectly connected to said one of said wall and door panel mounting structures by said axial operator and such that rotation of said operator output member moves said first arm portion in a pivotal manner, and wherein said second arm portion is connected to the other of said wall and said door panel mounting structures.

4. The system according to claim 3, wherein said axial operator is connected to said door panel mounting structure and wherein said first arm portion is indirectly connected to said door panel mounting structure by said axial operator, said second arm portion being connected to said wall mounting structure.

5. The system according to claim 4, wherein said door panel mounting structure is a door panel mounting bracket and wherein said controller is mounted on said door panel mounting bracket.

6. The system according to claim 5, further comprising a cover mounted in covering relation over said axial operator and said controller.

7. The system according to claim 6, wherein said cover has an opening for allowing said first arm portion to extend therethrough in connection with said operator output member.

8. The system according to claim 4, wherein said wall mounting structure is constructed and arranged to be connected to the frame such that said wall mounting structure is indirectly connected to the wall by the frame.

9. The system according to claim 8, wherein said wall mounting structure is a guide track constructed and arranged to mounted to said frame and wherein said second arm portion is constructed and arranged to be mounted for guided movement along said track, said linkage structure being constructed and arranged such that, when said system is installed on the swing door assembly, rotation of said operator member affects pivotal movement of said first arm portion, which in turn affects guided movement of said second arm portion along said track to move said track and said bracket relative to one another to thereby affect said powered swinging movement of the door panel.

10. The system according to claim 1, wherein said input device that generates said door movement signal is a remote transmitter adapted for carriage by a person and wherein said controller includes a receiver operable to receive said door movement signal.

11. The system according to claim 1, further comprising an electric strike constructed and arranged to be mounted to the frame at a position suitable for receipt of a latch bolt carried on the swinging door panel, said electric strike being movable between a locking position wherein said strike cooperates with the bolt to prevent movement of the door panel from the closed position thereof and a releasing position wherein said strike allows the door panel to move from the closed position thereof to the open position thereof, said electric strike being adapted for communication to said controller such that said controller controls the operation of said electric strike so as to selectively cause said electric strike to move between the closed position thereof and the open position thereof upon receiving a strike movement signal.

12. The system according to claim 1, wherein said planet gear and the interior surface of said orbit gear each have a plurality of teeth intermeshed with one another.

13. The system according to claim 1, wherein said planet gear carrier has a plurality of said mounting portions and wherein said reduction transmission has a plurality of said planet gears each respectively mounted on said mounting portions.

14. The system according to claim 1, wherein said reduction transmission has (a) a multiplicity of said planet gear carriers each having a plurality of planet gear mounting portions and (b) a plurality of said planet gears for each planet gear carrier, the planet gears of each plurality thereof being respectively mounted on said planet gear mounting portions of each plurality thereof.

15. The system according to claim 1, further comprising a manually operable clutch movable between (a) an engaged position wherein said clutch enables the operative connection between said operator and said linkage structure such that operation of said operator under power affects said powered swinging movement of said door panel and (b) a disengaged position wherein said clutch disables the operative connection between said operator and said linkage structure to permit manual swinging movement of the door panel;

said clutch having a manually engageable release member constructed and arranged to be manually moved in a releasing manner, said clutch being constructed and arranged such that manual movement of said release member in said releasing manner moves clutch from said engaged position thereof to disengaged positions thereof.

16. The system according to claim 15, wherein said clutch includes a spring biasing said clutch to said engaged position thereof.

17. The system according to claim 16, wherein said clutch includes a first clutch member connected to said linkage structure and a second clutch member connected to said operator, said first and second clutch members being movable relative to one another and being engaged together to affect said engaged position of said clutch and disengaged from one another to affect said disengaged position of said clutch, said spring being engaged with at least one of said clutch members to bias said clutch members into engagement together.

18. The system according to claim 17, wherein said first clutch member is fixed to said linkage structure and said second clutch member is movably mounted to said operator and wherein said release member is connected to said second clutch member such that moving said release member in said releasing manner moves said second clutch member to disengage said clutch members from one another, thereby affecting said disengaged position of said clutch.

19. The system according to claim 18, wherein said first and second clutch members are clutch discs.

20. The system according to claim 19, wherein said release member includes a handle structure that includes a first interconnecting member that extends alongside said operator and a hand grip portion on said first interconnecting member opposite said second clutch member.

21. The system according to claim 20, wherein said handle structure includes a second interconnecting member that extends alongside said operator opposite the second interconnecting member, said hand grip portion extending between and being connected to both said first and second interconnecting members.

22. The system according to claim 21, wherein said first and second interconnecting members extend beyond an end of said operator opposite said second clutch member.

23. The system according to claim 22, further comprising a cover mounted in covering relation with respect to said operator, said hand grip portion of said handle structure being external to said cover to facilitate operation thereof.

24. The system according to claim 23, wherein said hand grip portion is T-shaped.

25. The retrofit power-operated door operating system for installation on a manual swing door assembly, said door assembly comprising a frame mounted to a building wall and a swinging door panel manually movable in a swinging manner with respect to said door frame between opened and closed positions thereof by manual force, said retrofit door operating system comprising:

a door panel mounting structure constructed and arranged to be mounted to the door panel;

wall mounting structure constructed and arranged to be mounted to the building wall;

a linkage structure connected between said door panel mounting structure and said wall mounting structure;

a power-operated door operator operatively connected to said linkage structure such that, when said system is installed on said swing door assembly, said operator drives said linkage structure to affect powered swinging movement of said door panel between the open and closed positions thereof;

a manually operable clutch movable between (a) an engaged position wherein said clutch enables the operative connection between said operator and said linkage such that operation of said operator under power affects said powered swinging movement of said door panel and (b) a disengaged position wherein said clutch disables the operative connection between said operator and said linkage structure to permit manual swinging movement of the door panel said clutch having an externally mounted manually engageable release member constructed and arranged to be manually moved in a releasing manner, said clutch being constructed and arranged such that manual movement of said release member in said releasing manner moves clutch from said engaged position thereof to disengaged positions thereof;

an input device operable to generate a door movement signal; and a controller communicated to said operator, said controller being operable responsive to receiving said door movement signal to control operation of said operator so as to selectively cause said operator to drive said linkage structure as aforesaid to affect said powered swinging movement of the door panel between the opened and closed positions thereof.

26. The system according to claim 25, wherein said clutch includes a spring biasing said clutch to said engaged position thereof.

27. The system according to claim 26, wherein said clutch includes a first clutch member connected to said linkage structure and a second clutch member connected to said operator, said first and second clutch members being movable relative to one another and being engaged together to affect said engaged position of said clutch and disengaged from one another to affect said disengaged position of said clutch, said spring being engaged with at least one of said clutch members to bias said clutch members into engagement together.

28. The system according to claim 27, wherein said first clutch member is fixed to said linkage structure and said second clutch member is movably mounted to said operator and wherein said release member is connected to said second clutch member such that moving said release member in said releasing manner moves said second clutch member to disengage said clutch members from one another, thereby affecting said disengaged position of said clutch.

29. The system according to claim 28, wherein said first and second clutch members are clutch discs.

30. The system according to claim 28, wherein said release member includes a handle structure that includes a first interconnecting member that extends alongside said operator and a hand grip portion on said first interconnecting member opposite said second clutch member.

31. The system according to claim 30, wherein said handle structure includes a second interconnecting member that extends alongside said operator opposite the second interconnecting member, said hand grip portion extending between and being connected to both said first and second interconnecting members.

32. The system according to claim 31, wherein said first and second interconnecting members extend beyond an end of said operator opposite said second clutch member.

33. The system according to claim 32, further comprising a cover mounted in covering relation with respect to said operator, said hand grip portion of said handle structure being external to said cover to facilitate operation thereof.

34. The system according to claim 33, wherein said hand grip portion is T-shaped.

35. The system according to claim 33, wherein said operator is oriented generally vertically when said system is installed on the door assembly.

36. The system according to claim 35, wherein said linkage structure comprises first and second arm portions movably connected to one another.

37. The system according to claim 36, wherein said operator is connected to one of said wall and door panel mounting portions, wherein said first arm portion is operatively connected to said operator such that said first arm portion is indirectly connected to said one of said wall and door panel mounting structures by said operator and such that said operator moves said first arm portion in a pivotal manner, and wherein said second arm portion is connected to the other of said wall and said door panel mounting structures.

38. The system according to claim 37, wherein said operator is connected to said door panel mounting structure and wherein said first arm portion is indirectly connected to said door panel mounting structure by said axial operator, said second arm portion being connected to said wall mounting structure.

39. The system according to claim 38, wherein said door panel mounting structure is a door panel mounting bracket and wherein said controller is mounted on said door panel mounting bracket.

40. The system according to claim 38, wherein said cover has an opening for allowing said first arm portion to extend therethrough in connection with said operator output member.

41. The system according to claim 38, wherein said wall mounting structure is constructed and arranged to be connected to the frame such that said wall mounting structure is indirectly connected to the wall by the frame.

42. The system according to claim 41, wherein said wall mounting structure is a guide track constructed and arranged to be mounted to said frame and wherein said second arm portion is constructed and arranged to be mounted for guided movement along said track, said linkage structure being constructed and arranged such that, when said system is installed on the swing door assembly, operation of said operator affects pivotal movement of said first arm portion, which in turn affects guided movement of said second arm portion along said track to move said track and said bracket relative to one another to thereby affect said powered swinging movement of the door panel.

43. The system according to claim 26, further comprising a releasable locking mechanism constructed and arranged to releasably lock said clutch in said disengaged position thereof, said releasable locking mechanism being releasable to allow said spring to return said clutch to said engaged position thereof.

44. The system according to claim 25, wherein said input device that generates said door movement signal is a remote transmitter adapted for carriage by a person and wherein said controller includes a receiver operable to receive said door movement signal.

* * * * *